United States Patent
Martin et al.

(10) Patent No.: US 10,869,211 B2
(45) Date of Patent: *Dec. 15, 2020

(54) METHOD, MOBILE COMMUNICATIONS DEVICE, SYSTEM AND CIRCUITRY FOR ESTIMATING AN OCCUPANCY LEVEL OF A SHARED CHANNEL

(71) Applicant: Sony Corporation, Tokyo (JP)

(72) Inventors: Brian Alexander Martin, Basingstoke (GB); Martin Warwick Beale, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/458,765

(22) Filed: Jul. 1, 2019

(65) Prior Publication Data
US 2019/0327627 A1   Oct. 24, 2019

Related U.S. Application Data

(63) Continuation of application No. 15/323,586, filed as application No. PCT/EP2015/066962 on Jul. 24, 2015, now Pat. No. 10,375,592.

(30) Foreign Application Priority Data

Jul. 25, 2014 (EP) .................................... 14178654

(51) Int. Cl.
*H04W 24/08* (2009.01)
*H04W 72/04* (2009.01)
(Continued)

(52) U.S. Cl.
CPC ........... *H04W 24/08* (2013.01); *H04W 16/14* (2013.01); *H04W 24/02* (2013.01); *H04W 24/10* (2013.01);
(Continued)

(58) Field of Classification Search
CPC ............. H04W 24/08; H04W 72/0453; H04W 72/0446; H04W 72/042; H04W 72/0413;
(Continued)

(56) References Cited

U.S. PATENT DOCUMENTS 7,317,682 B2   1/2008   Gu et al.
2007/0147240 A1   6/2007   Benveniste
(Continued)

FOREIGN PATENT DOCUMENTS

JP   2013-183317 A   9/2013
WO   2013/155672 A1   10/2013
(Continued)

OTHER PUBLICATIONS

Japanese Reasons for Refusal dated Mar. 26, 2019 in Japanese Application No. 2017-504018.
(Continued)

*Primary Examiner* — Shailendra Kumar
(74) *Attorney, Agent, or Firm* — Xsensus, LLP

(57) ABSTRACT

A method determining indication of an occupancy level in a mobile communications system including a base station to communicate with a mobile communications device via a wireless interface provided by a first frequency channel allocated to mobile networks communications for the mobile communications system and by a shared channel which can be shared by the mobile communications system and by other wireless communications systems. The method includes: a mobile communications device: measuring, for each of plural first time periods within a second time period, a channel utilization on the shared channel; determining channel occupancy states for the shared channel for each of the first time periods based on the measured channel utilization; and determining an indication of an occupancy level for the shared channel for the second time period, the
(Continued)

indication of an occupancy level determined based on the occupancy states for the shared channel for each first time period.

18 Claims, 9 Drawing Sheets

(51) Int. Cl.
  H04W 16/14 (2009.01)
  H04W 24/10 (2009.01)
  H04W 24/02 (2009.01)
  H04W 74/08 (2009.01)
(52) U.S. Cl.
  CPC ..... *H04W 72/042* (2013.01); *H04W 72/0413* (2013.01); *H04W 72/0446* (2013.01); *H04W 72/0453* (2013.01); *H04W 74/0808* (2013.01)
(58) Field of Classification Search
  CPC ..... H04W 24/10; H04W 16/14; H04W 24/02; H04W 74/0808
  See application file for complete search history.

(56) References Cited

U.S. PATENT DOCUMENTS

| | | | | |
|---|---|---|---|---|
| 2010/0008226 | A1* | 1/2010 | Kang | H04W 4/00 370/235 |
| 2013/0322279 | A1* | 12/2013 | Chincholi | H04W 24/10 370/252 |
| 2015/0126207 | A1* | 5/2015 | Li | H04W 16/14 455/452.1 |

FOREIGN PATENT DOCUMENTS

| | | | |
|---|---|---|---|
| WO | WO 2013/155672 A1 * | 10/2013 | |
| WO | 2013/179095 A1 | 12/2013 | |
| WO | 2015/185369 A1 | 12/2015 | |
| WO | 2015/185370 A1 | 12/2015 | |
| WO | 2016/012144 A1 | 1/2016 | |

OTHER PUBLICATIONS

Harri Holma, et al., "LTE for UMTS OFDMA and SC-FDMA Based Radio Access," John Wiley and Sons, 2009, (4 pages).
ETSI TS 136 211 V11.5.0 (Jan. 2014 ), "Technical Specification, LTE; Evolved Universal Terrestrial Radio Access (E-UTRA); Physical channels and modulation," 3GPP TS 36.211 version 11.5.0 Release Jan. 11, 2014, (122 pages).
ETSI TS 136 212 V11.4.0 (Jan. 2014 ), "Technical Specification, LTE; Evolved Universal Terrestrial Radio Access (E-UTRA); Multiplexing and channel coding," 3GPP TS 36.212 version 11.4.0 Release Jan. 11, 2014 (86 pages).
ETSI TS 136 213 V11.6.0 (Mar. 2014), "Technical Specification, LTE; Evolved Universal Terrestrial Radio Access (E-UTRA); Physical layer procedures," 3GPP TS 36.213 version 11.6.0 Release Mar. 11, 2014, (184 pages).
ETSI TS 136 321 V11.5.0 (Mar. 2014), "Technical Specification, LTE; Evolved Universal Terrestrial Radio Access (E-UTRA); Medium Access Control (MAC) protocol specification," 3GPP TS 36.321 version 11.5.0 Release Mar. 11, 2014, (59 pages).
ETSI TS 136 331 V11.7.0 (Mar. 2014), "Technical Specification, LTE; Evolved Universal Terrestrial Radio Access (E-UTRA); Radio Resource Control (RRC); Protocol specification," 3GPP TS 36.331 version 11.7.0 Release Mar. 11, 2014, (354 pages).
ETSI TS 137 320 V11.3.0 (Apr. 2013), "Technical Specification, Universal Mobile Telecommunications System (UMTS); LTE; Universal Terrestrial Radio Access (UTRA) and Evolved Universal Terrestrial Radio Access (E-UTRA); Radio measurement collection for Minimization of Drive Tests (MDT); Overall description; Stage 2," 3GPP TS 37.320 version 11.3.0 Release Apr. 11, 2013, (25 pages).
"Technical Report; 3rd Generation Partnership Project; Technical Specification Group Radio Access Network; Study on Minimization of drive-tests in Next Generation Networks; (Release 9)," 3GPP TR 36.805 V9.0.0 (Dec. 2009), Dec. 2009, (24 pages).
ETSI TS 132 422 V11.9.0 (Mar. 2014), "Technical Specification, Digital cellular telecommunications system (Phase 2+); Universal Mobile Telecommunications System (UMTS); LTE; Telecommunication management; Subscriber and equipment trace; Trace control and configuration management," 3GPP TS 32.422 version 11.9.0 Release Mar. 11, 2014, (135 pages).
International Search Report dated Oct. 27, 2015 in PCT/EP2015/066962 filed Jul. 24, 2015.

* cited by examiner

METHOD, MOBILE COMMUNICATIONS DEVICE, SYSTEM AND CIRCUITRY FOR ESTIMATING AN OCCUPANCY LEVEL OF A SHARED CHANNEL

CROSS-REFERENCE TO RELATED APPLICATIONS

This application is a continuation of U.S. application Ser. No. 15/323,586, filed Jan. 3, 2017, which is based on PCT filing PCT/EP2015/066962, filed Jul. 24, 2015, and claims priority to EP 14178654.1, filed Jul. 25, 2014, the entire contents of each are incorporated herein by reference.

BACKGROUND

Field

The present disclosure relates to a method of determining an indication of an occupancy level in a mobile communications system, a mobile communications device for use in a mobile communications system, a mobile communications system and circuitry for a mobile communications device for use in a mobile telecommunications system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

It is well known in the field of wireless telecommunications for regions of the radio spectrum to be assigned to different mobile network operators (MNO) for their exclusive use through a license. A license typically grants an MNO exclusive use over a number of years of a predefined portion of the radio frequency spectrum in which to deploy a mobile communications network (e.g. GSM, WCDMA/HSPA, LTE/LTE-A). For example, LTE frequencies are conventionally allocated exclusively to mobile networks communications (e.g. LTE communications) and, in turn, the LTE frequencies may be divided into bands which can themselves be allocated exclusively to one or more mobile operators. As a result of this approach, an operator has guarantees of no other radio services interfering with the radio resources that have been assigned to the operator, and within the limitations of the license conditions it has exclusive control over what radio technology it deploys in the network. Consequently, a wireless telecommunications system that is primarily designed to operate using radio resources that have been licensed for exclusive use by the wireless telecommunications system can operate with a degree of centralised control and coordination to help make most efficient use of the available radio resources. Such a wireless telecommunication system also manages all the interference internally, based on standard specifications, since the license grants it good immunity from external interference sources. Coexistence of different devices deployed on an MNO's licensed band is managed through conformance to relevant radio standards. Licensed spectrum is today usually assigned to operators via government-organised auctions, but so-called "beauty contests" continue also to be in use.

It is also well known in the field of wireless telecommunications for regions of the available radio spectrum to remain unlicensed. Unlicensed (license exempt) radio spectrum may, at least to some extent, be freely used by a number of different technologies, such as Wi-Fi and Bluetooth and other non-3GPP radio access technologies. Operating parameters for devices using unlicensed spectrum bands are typically stipulated by technical regulatory requirements such as e.g. the FCC Part 15 rule for 2.4 GHz ISM band. Coexistence of different devices deployed on unlicensed band, due to the lack of centralised coordination and control, is usually based on such technical rules and various politeness protocols.

The use of wireless telecommunications system technologies designed for operation on licensed radio spectrum, such as LTE, is becoming more and more prevalent, both in terms of increasing take-up of established uses for wireless telecommunications technologies, and also the introduction of new uses, e.g., in the developing field of machine-type communications (MTC). In order to help provide more bandwidth to support this increased use of wireless telecommunications technologies, it has recently been proposed to use unlicensed radio spectrum resources to support operations on licensed radio spectrum.

However, in contrast to licensed spectrum, unlicensed spectrum can be shared and used among different technologies, or different networks using the same technology, without any co-ordinated/centralised control, for example to provide protection against interference. As a consequence of this, the use of wireless technologies in unlicensed spectrum can be subject to unpredictable interference and has no guarantees of spectrum resources, i.e. the radio connection takes place on a best effort basis. This means that wireless network technologies, such as LTE, which are generally designed to operate using licensed radio resources, require modified approaches to allow them to efficiently use unlicensed radio resources, and in particular to co-exist reliably and fairly with other radio access technologies that may be simultaneously operating in the unlicensed spectrum band.

Likewise, in a system where a spectrum has been licensed to more than one party, e.g. two MNOs, each MNO does not have exclusive use of the spectrum and the spectrum is shared between them. The communications from one MNO can interfere with the communications from the other MNO and while each MNO can try to reduce the interference level within their own network, they have no direct control over the communications from the other MNO's communications.

Therefore, deploying a mobile radio access technology system primarily designed to operate in licensed spectrum bands (i.e. having exclusive access to, and hence a level of control over, the relevant radio resources) in a manner which is required by operation in a shared (unlicensed or licensed) spectrum bands (i.e. without having exclusive access to at least some of the relevant radio resources), gives rise to new technical challenges.

SUMMARY

According to an aspect of the disclosure there is provided a method of determining an indication of an occupancy level in a mobile communications system, wherein the mobile communications system comprises a base station arranged to communicate with a mobile communications device via a wireless interface provided by a first frequency channel allocated to mobile networks communications for the mobile communications system and by a shared channel which can be shared by the mobile communications system and by other wireless communications systems. The method comprising a mobile communications device: measuring, for each of a plurality of first time periods within a second time period, a channel utilisation on the shared channel; determining channel occupancy states for the shared channel for each of the first time periods based on the measured channel utilisation; and determining an indication of an occupancy level for the shared channel for the second time period, wherein the indication of an occupancy level is determined based on the occupancy states for the shared channel for each of the first time periods.

The mobile communications device may generate a measurement report based on the indication of an occupancy level for the shared channel and transmit the measurement report to the base station. For example, the mobile communications device may detect that the shared channel is congested when an occupancy level for the shared channel is estimated to be above a congestion threshold; and may, upon detecting that the shared channel is congested, generate and transmit the measurement report. Upon receipt of the measurement report, the mobile communications system may determine whether to activate or deactivate the shared channel for uplink and/or downlink communications with mobile communications devices based on the indication of an occupancy level for the shared channel. A measurement report may be transmitted at one or more of the following times: periodically, upon receipt of a measurement request, at a randomly selected time or when one or more predetermined events occur.

The indication of an occupancy level may be determined at one or more of the following times: periodically, upon receipt of a measurement request, at a randomly selected time or when one or more predetermined events occur.

In the above paragraphs, "a predetermined event" may comprise one of: a mobile communications device being powered up, a mobile communication device experiencing congestion on a frequency channel, a mobile communication device experiencing congestion in a time period, a mobile communication device experiencing congestion on a channelization code, a user request, a mobile communications network request, the expiry of a timer and a mobile communication device having a low utilisation level.

The mobile communications device measuring a channel utilisation on the shared channel may comprise determining whether the mobile communications system is transmitting signals on the shared channel, when it is determined that the mobile communications system is transmitting signals on the shared channel, measuring the channel utilisation based on an interference measurement indicating an interference level identified for the signals transmitted on the shared channel by the mobile communications system; and when it is determined that the mobile communications system is not transmitting signals on the shared channel, measuring the channel utilisation based on a measurement indicating a power received via the shared channel.

The mobile communications device may comprise a first transceiver operable to receive shared channel signals with the base station using a first technology and a second transceiver operable to receive shared channel signals using a second technology, the second technology being different from the first technology. The method may then comprise the mobile communications device measuring the channel utilisation based on a first channel utilisation derived from signals received by the first transceiver and on a second channel utilisation derived from signals received by the second transceiver.

According to another aspect of the present disclosure, there may be provided a mobile communications device for use in a mobile communications system, the system comprising a base station arranged to communicate with mobile communications devices via a wireless interface provided by a first frequency channel allocated to mobile networks communications for the mobile communications system and by a shared frequency channel which can be used by the mobile communications system and by other wireless communications systems. The mobile communications device comprises a controller unit and a transceiver unit for transmitting and receiving signals via the wireless interface. The controller unit is configured to: measure, for each of a plurality of first time periods within a second time period, a channel utilisation on the shared channel based on signals received by the transceiver unit; determine channel occupancy states for the shared channel for each of the first time periods based on the measured channel utilisation; and determine an indication of an occupancy level for the shared channel for the second time period, wherein the indication of an occupancy level is determined based on the occupancy states for the shared channel for each of the first time periods.

According to a further aspect of the present disclosure, there is provided a mobile communications system comprising a base station arranged to communicate with mobile communications devices via a wireless interface provided by a first frequency channel allocated to mobile networks communications for the mobile communications system and by a shared frequency channel which can be used by the mobile communications system and by other wireless communications systems; and a first mobile communications device. The mobile communications device is configured to measure, for each of a plurality of first time periods within a second time period, a channel utilisation on the shared channel; determine channel occupancy states for each of the first time periods and for the shared channel based on the measured channel utilisation; and determine an indication of an occupancy level for the second time period and for the shared channel wherein the indication of an occupancy level is determined based on the occupancy states for the shared channel for each of the first time periods.

According to yet another aspect of the present disclosure, there is provided circuitry for a mobile communications device for use in a mobile telecommunications system, the system comprising a base station arranged to communicate with mobile communications devices via a wireless interface provided by a first frequency channel allocated to mobile network communications for the mobile communications system and by a shared frequency channel which can be used by the mobile communications system and by other wireless communications systems. The circuitry comprises a controller element and a transceiver element configured to operate together to: measure, for each of a plurality of first time periods within a second time period, a channel utilisation on the shared channel based on signals received by the transceiver unit; determine channel occupancy states for the shared channel for each of the first time periods based on the measured channel utilisation; and determine an indication of an occupancy level for the shared channel for the second time period, wherein the indication of an occupancy level is determined based on the occupancy states for the shared channel for each of the first time periods.

The foregoing paragraphs have been provided by way of general introduction, and are not intended to limit the scope of the following claims. The described examples, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF EXAMPLES

Figure 1:
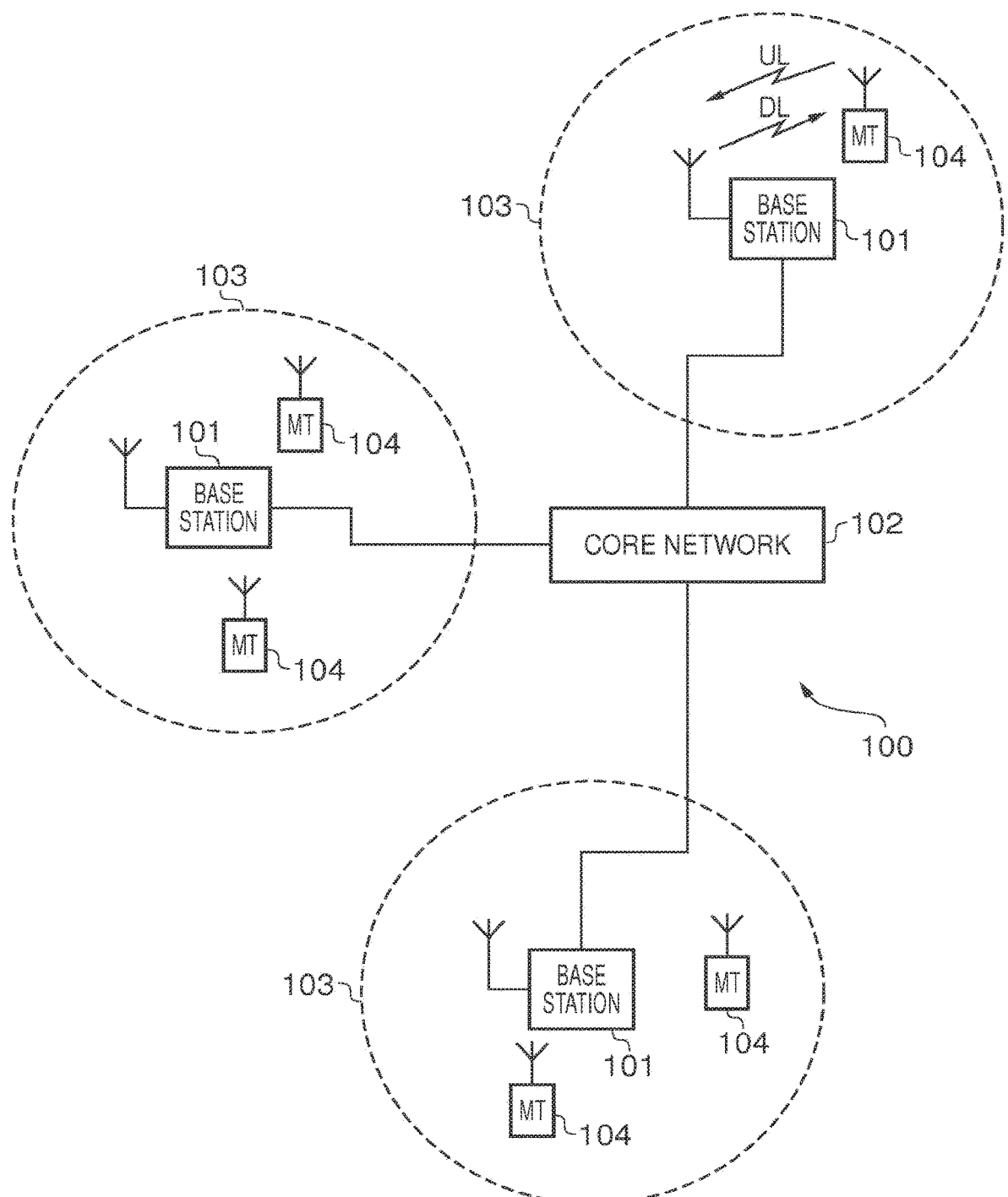
FIG. 1 provides a schematic diagram illustrating an example of a mobile telecommunication system.

FIG. 1 provides a schematic diagram illustrating some basic functionality of a mobile telecommunications network/system 100 operating in accordance with LTE principles and which may be adapted to implement examples of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that are licensed for use by the operator of the network 100. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, and so forth. Base stations may also be referred to as transceiver stations/nodeBs/e-nodeBs, and so forth.

Figure 2:
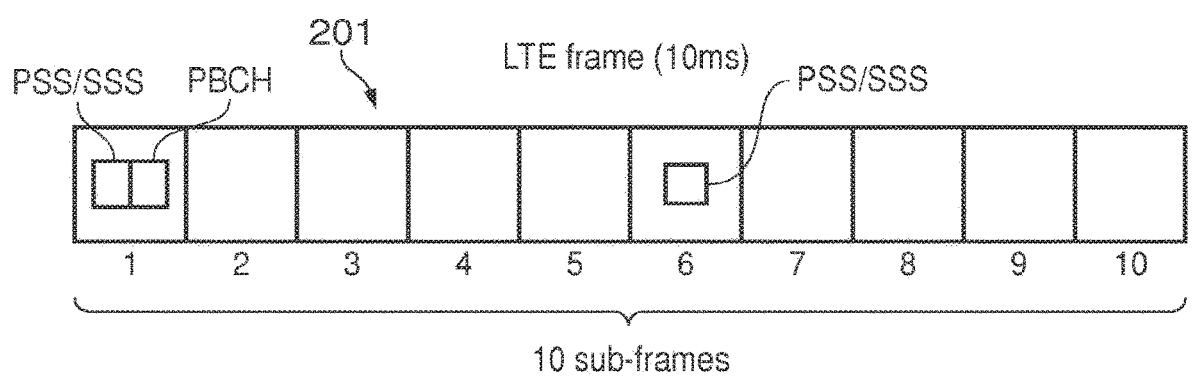
FIG. 2 provides a schematic diagram illustrating a LTE radio frame.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink. FIG. 2 shows a schematic diagram illustrating an OFDM based LTE downlink radio frame 201. The LTE downlink radio frame is transmitted from a LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
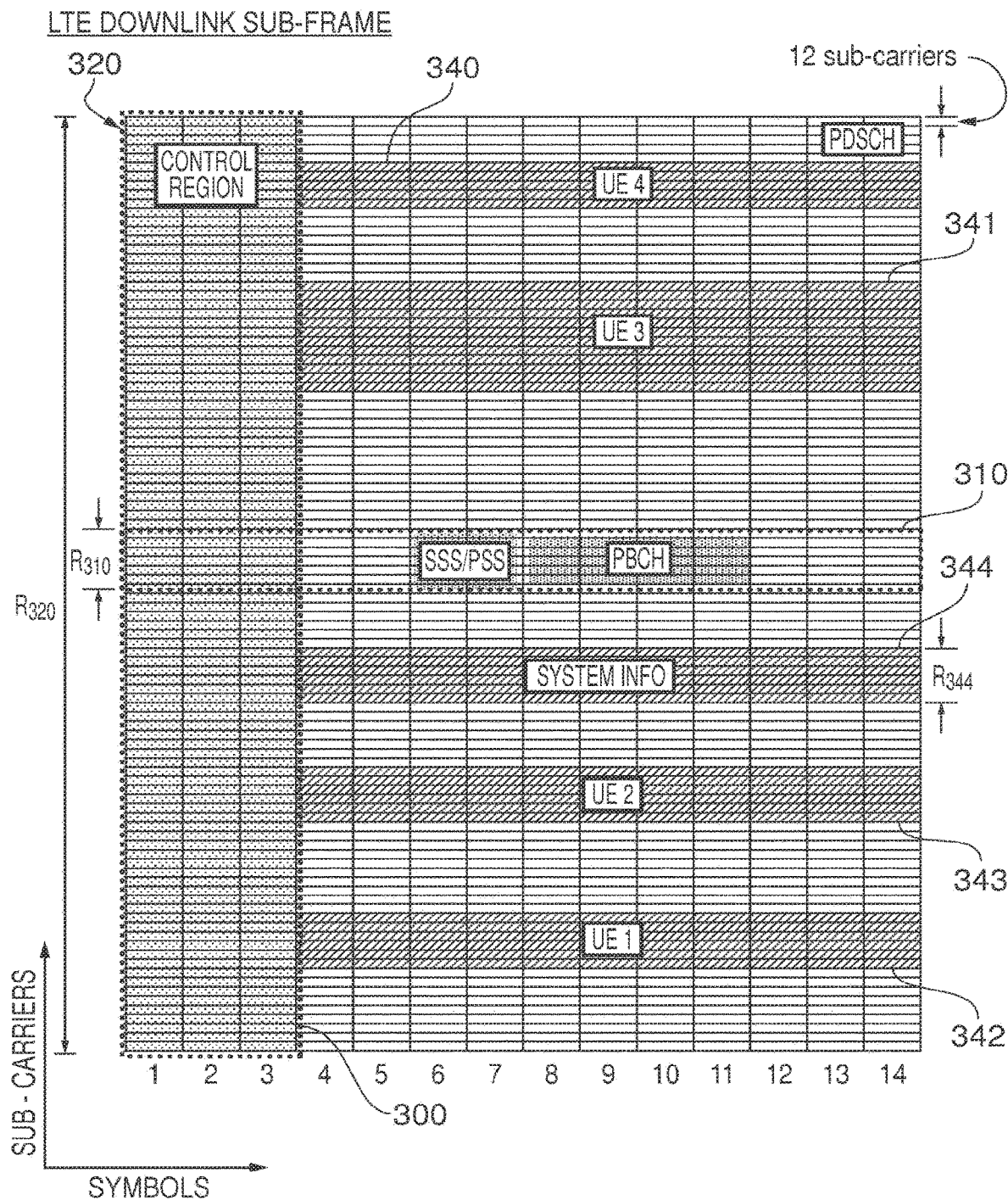
FIG. 3 provides a schematic diagram illustrating an example of a LTE downlink radio subframe.

FIG. 3 is a schematic diagram of a grid which illustrates the structure of an example conventional downlink LTE subframe. The subframe comprises a predetermined number of symbols which are transmitted over a 1 ms period. Each symbol comprises a predetermined number of orthogonal subcarriers distributed across the bandwidth of the downlink radio carrier.

The example subframe shown in FIG. 3 comprises 14 symbols and 1200 subcarriers spread across a 20 MHz bandwidth licensed for use by the operator of the network 100, and this example is the first subframe in a frame (hence it contains PBCH). The smallest allocation of physical resource for transmission in LTE is a resource block comprising twelve subcarriers transmitted over one subframe. For clarity, in FIG. 3, each individual resource element is not shown, instead each individual box in the subframe grid corresponds to twelve subcarriers transmitted on one symbol.

FIG. 3 shows in hatching resource allocations for four LTE terminals 340, 341, 342, 343. For example, the resource allocation 340 for LTE terminal UE 4 extends over five blocks of twelve subcarriers (i.e. 60 subcarriers), the resource allocation 343 for LTE terminal UE2 extends over six blocks of twelve subcarriers (i.e. 72 subcarriers), and so on.

Control channel data can be transmitted in a control region 300 (indicated by dotted-shading in FIG. 3) of the subframe comprising the first "n" symbols of the subframe where "n" can vary between one and three symbols for channel bandwidths of 3 MHz or greater and where "n" can vary between two and four symbols for a channel bandwidth of 1.4 MHz. For the sake of providing a concrete example, the following description relates to host carriers with a channel bandwidth of 3 MHz or greater so the maximum value of "n" will be 3 (as in the example of FIG. 3). The data transmitted in the control region 300 includes data transmitted on the physical downlink control channel (PDCCH), the physical control format indicator channel (PCFICH) and the physical HARQ indicator channel (PHICH). These channels transmit physical layer control information. Control channel data can also or alternatively be transmitted in a second region of the subframe comprising a number of subcarriers for a time substantially equivalent to the duration of the subframe, or substantially equivalent to the duration of the subframe remaining after the "n" symbols. The data transmitted in this second region is transmitted on the enhanced physical downlink control channel (EPDCCH). This channel transmits physical layer control information which may be in addition to that transmitted on other physical layer control channels.

PDCCH and EPDCCH contain control data indicating which subcarriers of the subframe have been allocated to specific terminals (or all terminals or subset of terminals). This may be referred to as physical-layer control signalling/data. Thus, the PDCCH and/or EPDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols for channel bandwidths of 3 MHz or greater and between two and four symbols for channel bandwidths of 1.4 MHz).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 subcarriers wide (corresponding to a transmission bandwidth of 1.08 MHz). The PSS and SSS are synchronisation signals that once detected allow a LTE terminal device to achieve frame synchronisation and determine the physical layer cell identity of the enhanced Node B transmitting the downlink signal.

The PBCH carries information about the cell, comprising a master information block (MIB) that includes parameters that LTE terminals use to properly access the cell. Data transmitted to terminals on the physical downlink shared channel (PDSCH), which may also be referred to as a downlink data channel, can be transmitted in other resource elements of the subframe. In general PDSCH conveys a combination of user-plane data and non-physical layer control-plane data (such as Radio Resource Control (RRC) and Non Access Stratum (NAS) signalling). The user-plane data and non-physical layer control-plane data conveyed on PDSCH may be referred to as higher layer data (i.e. data associated with a layer higher than the physical layer).

FIG. 3 also shows a region of PDSCH containing system information and extending over a bandwidth of R344. A conventional LTE subframe will also include reference signals which are not shown in FIG. 3 in the interests of clarity.

The number of subcarriers in a LTE channel can vary depending on the configuration of the transmission network. Typically this variation is from 72 sub carriers contained within a 1.4 MHz channel bandwidth to 1200 subcarriers contained within a 20 MHz channel bandwidth (as schematically shown in FIG. 3). As is known in the art, data transmitted on the PDCCH, PCFICH and PHICH is typically distributed on the subcarriers across the entire bandwidth of the subframe to provide for frequency diversity.

The communications between the base stations 101 and the terminal devices 104 are conventionally made using radio resources that have been licensed for exclusive use by the operator of the network 100. These licensed radio resources will be only a portion of the overall radio spectrum. Other devices within the environment of the network 100 may be wirelessly communicating using other radio resources. For example, a different operator's network may be operating within the same geographical region using different radio resources that have been licensed for use by the different operator. Other devices may be operating using other radio resources in an unlicensed radio spectrum band, for example using Wi-Fi or Bluetooth technologies.

As noted above, it has been proposed that a wireless telecommunications network using radio resources in a licensed portion of the radio spectrum might be supported by additionally using radio resources in an unlicensed portion of the radio spectrum (i.e. a portion of the radio spectrum over which the wireless telecommunications network does not have exclusive access, but rather which is shared by other access technologies and/or other wireless telecommunications networks). In particular, it has been proposed that carrier aggregation based techniques may be used to allow unlicensed radio resources to be used in conjunction with licensed radio resources.

In essence, carrier aggregation allows for communications between a base station and a terminal device to be made using more than one carrier. This can increase the maximum data rate that may be achieved between a base station and a terminal device as compared to when using only one carrier and can help enable more efficient and productive use of fragmented spectrum. Individual carriers that are aggregated are commonly referred to as component carriers (or sometimes simply components). In the context of LTE, carrier aggregation was introduced in Release 10 of the standard. In accordance with the current standards for carrier aggregation in an LTE-based system, up to five component carriers can be aggregated for each of downlink and uplink. The component carriers are not required to be contiguous with one another and can have a system bandwidth corresponding to any of the LTE-defined values (1.4 MHz, 3 MHz, 5 MHz, 10 MHz, 15 MHz and 20 MHz), thereby allowing a total bandwidth of up to 100 MHz. Of course it will be appreciated this is just one example of a specific carrier aggregation implementation and other implementations may allow for different numbers of component carriers and/or bandwidths.

Further information on the operation of carrier aggregation in the context of LTE-based wireless telecommunications systems can be found in the relevant standards documents, such as ETSI TS 136 211 V11.5.0 (2014 January)/3GPP TS 36.211 version 11.5.0 Release 11 [2], ETSI TS 136 212 V11.4.0 (2014 January)/3GPP TS 36.212 version 11.4.0 Release 11 [3]; ETSI TS 136 213 V11.6.0 (2014 March)/3GPP TS 36.213 version 11.6.0 Release 11 [4]; ETSI TS 136 321 V11.5.0 (2014 March)/3GPP TS 36.321 version 11.5.0 Release 11 [5]; and ETSI TS 136 331 V11.7.0 (2014 March)/3GPP TS 36.331 version 11.7.0 Release 11 [6].

In accordance with the terminology and implementation used for carrier aggregation in the context of an LTE-based system, a cell is denoted the 'primary cell', or Pcell, for a terminal device if it is the cell that is initially configured during connection setup for the terminal device. Thus the primary cell handles RRC (radio resource control) connection so establishment/re-establishment for the terminal device. The primary cell is associated with a downlink component carrier and an uplink component carrier (CoC). These may sometimes be referred to herein as primary component carriers. A cell that is configured for use by the terminal device after initial connection establishment on the Pcell is termed a 'secondary cell', or Scell. Thus the secondary cells are configured after connection establishment to provide additional radio resources. The carriers associated with Scells may sometimes be referred to herein as secondary component carriers. Since in LTE up to five component carriers can be aggregated, up to four Scells (correspondingly associated with up to four secondary component carriers) can be configured for aggregation with the primary cell (associated with the primary component carrier). An Scell might not have both a downlink and uplink component carrier and the association between uplink component carriers and downlink component carriers is signalled in SIB2 via system information on each downlink component carrier. The primary cell supports PDCCH and PDSCH on downlink and PUSCH and PUCCH on uplink whereas the secondary cell(s) support PDCCH and PDSCH on downlink and PUSCH on uplink, but not PUCCH. The enhanced PDCCH (E-PDCCH) may be used in addition to or instead of the PDCCH on both the primary and secondary cells. Measurement and mobility procedures are handled on the Pcell and the Pcell cannot be de-activated. The Scell(s) may be dynamically activated and deactivated, for example according to traffic needs, though MAC layer signalling to the terminal device. An Scell for a terminal device may also be deactivated automatically (time out) if the terminal device does not receive any transmission resource allocations on the Scell for a threshold amount of time.

Some aspects of physical layer control signalling for an LTE-based implementation of carrier aggregation based on the current standards are now described.

Each downlink component carrier has the normal LTE control channels: (E)PDCCH, PCFICH and PHICH. However, carrier aggregation introduces the possibility of so-called cross-carrier scheduling (XCS) on PDCCH. To support cross-carrier scheduling, a downlink control information (DCI) message on PDCCH includes a carrier indicator field (CIF) comprising three bits to indicate which of the component carriers the PDCCH message applies to. If there is no CIF, the PDCCH is treated as applying to the carrier on which it is received. A motivation for providing cross-carrier scheduling primarily applies for heterogeneous network (het-net) scenarios where overlaid macro- and small-cells may operate carrier aggregation in the same band. The effects of interference between the respective macro- and small-cells' PDCCH signalling can be mitigated by having the macro-cell transmit its PDCCH signalling on one component carrier at relatively high transmit power (to provide coverage across the macro-cell), while the small-cells use an alternative component carrier for their PDCCH scheduling.

The control region supporting PDCCH may differ in size (i.e. number of OFDM symbols) between component carriers, so they can carry different PCFICH values. However, the potential for interference in the control region in a het-net implementation may mean that PCFICH cannot be decoded on a particular component carrier. Therefore, current LTE standards allow for each component to carry a semi-static indication of which OFDM symbol PDSCH can be assumed to begin on in each subframe. If fewer OFDM symbols are actually used for the control region, the free/spare OFDM symbol(s) may be used for PDSCH transmissions to terminal devices which are not being cross-carrier scheduled as they will decode the actual PCFICH. If more OFDM symbols are actually used for the control region, there will be some degree of performance degradation for the cross-carrier scheduled terminal devices.

PHICH signalling is sent on the downlink component carrier that sent the PDCCH signalling containing the PUSCH allocation to which the PHICH signalling relates. Accordingly, one downlink component carrier may carry PHICH for more than one component carrier.

In the uplink, the basic operation of PUCCH is not altered by the introduction of carrier aggregation. However, a new PUCCH format (format 3) is introduced to support the sending of acknowledgement signalling (ACK/NACK signalling) for multiple downlink component carriers, and with some alterations to format 1b to increase the number of ACK/NACK bits it can carry.

In current LTE-based carrier aggregation scenarios, primary and secondary synchronisation signalling (PSS and SSS) are transmitted on all component carriers using the same physical-layer cell identity (PCI) and component carriers are all synchronised with one another. This can help with cell search and discovery procedures. Issues relating to security and system information (SI) are handled by the Pcell. In particular, when activating an Scell, the Pcell delivers the relevant SI for the Scell to the terminal device using dedicated RRC signalling. If the system information relating to a Scell changes, the Scell is released and re-added by Pcell RRC signalling (in one RRC message). Pcell changes, e.g. due to long-term fluctuations in channel quality across the Pcell bandwidth, are handled using a modified handover procedure. The source Pcell passes all the relevant carrier aggregation (CA) information to the target Pcell so the terminal device can begin to use all the assigned component carriers when handover is complete.

Random access procedures are primarily handled on the uplink component carrier of Pcell for a terminal device, although some aspects of contention resolution signalling may be cross-carrier scheduled to another serving cell (i.e. an Scell).

As noted above, carrier aggregation is one approach for making use of unlicensed radio spectrum resources in wireless communication networks which are primarily designed to use licensed radio spectrum. In broad summary, a carrier aggregation based approach may be used to configure and operate a first component carrier (e.g. a primary component carrier associated with a Pcell in LTE terminology) within a region of the radio spectrum that has been licensed for use by a wireless telecommunications network, and to also configure and operate one or more further component carriers (e.g. a secondary component carrier associated with an Scell in LTE terminology) in an unlicensed region of the radio spectrum. The secondary component carrier(s) operating in the unlicensed region of the radio spectrum may do so in an opportunistic manner by making use of the unlicensed radio resources when they are available. There may also be provisions made for restricting the extent to which a given operator can make use of the unlicensed radio resources, for example by defining what might be referred to as politeness protocols.

Although known carrier aggregation schemes can form a basis for using unlicensed radio spectrum resources (or other forms of shared radio resources) in conjunction with licensed radio spectrum resources, some modifications to known carrier aggregation techniques may be appropriate to help optimise performance. This is because radio interference in the unlicensed radio spectrum can be expected to be subject to a wider range of unknown and unpredictable variations in time and frequency than might be seen within a region of the radio spectrum which has been licensed for use by a particular wireless communications system. For a given wireless telecommunications system operating in accordance with a given technology, such as LTE-A, interference in the unlicensed radio spectrum may arise from other systems operating substantially the same technology, or systems operating according to different technologies, such as Wi-Fi or Bluetooth.

Figure 4:
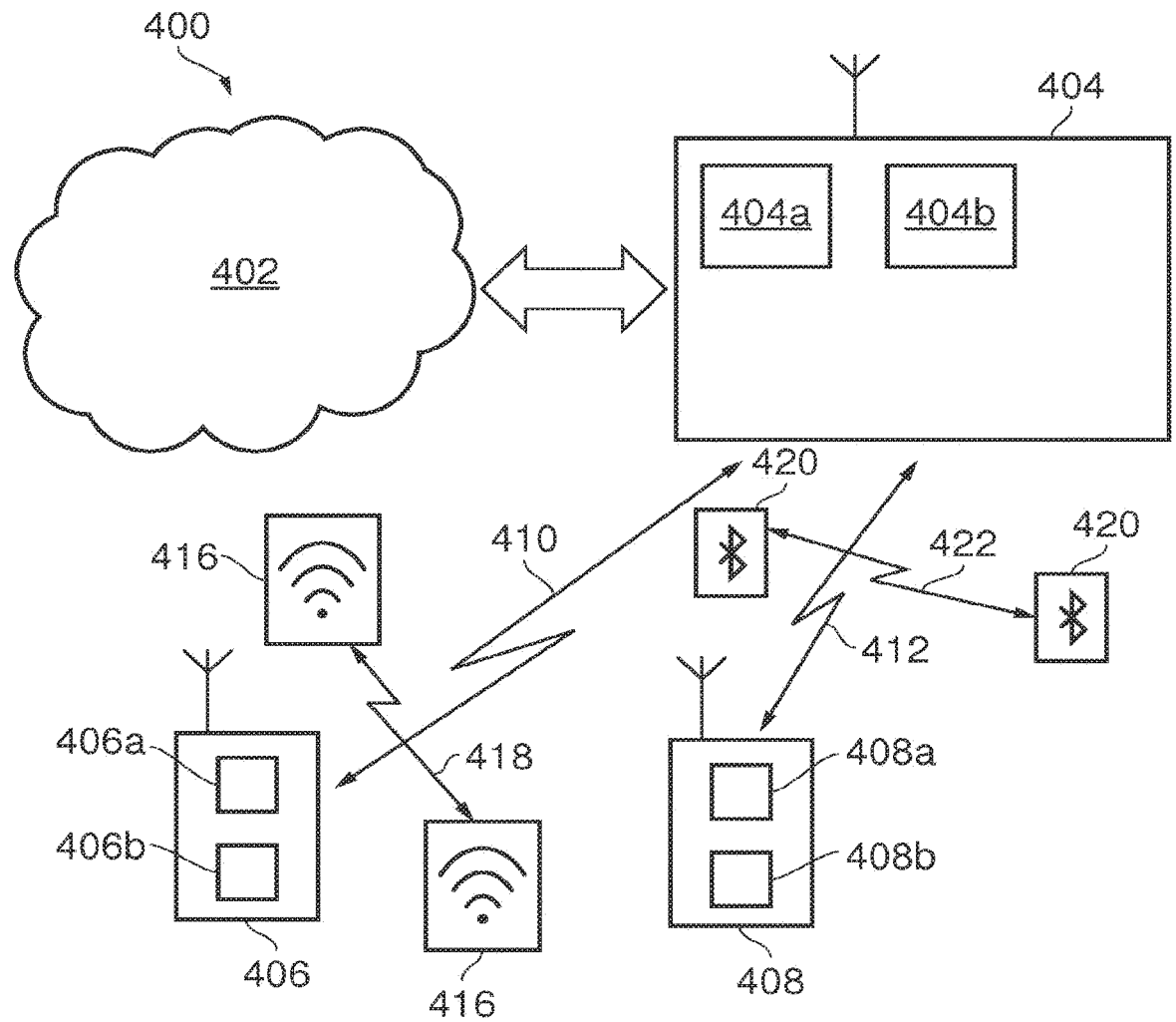
FIG. 4 schematically represents a wireless telecommunications system.

FIG. 4 schematically shows a telecommunications system 400. The telecommunications system 400 in this example is based broadly on a LTE-type architecture. As such many aspects of the operation of the telecommunications system 400 are standard and well understood and not described here in detail in the interest of brevity. Operational aspects of the telecommunications system 400 which are not specifically described herein may be implemented in accordance with any known techniques, for example according to the established LTE-standards and known variations thereof.

The telecommunications system 400 comprises a core network part (evolved packet core) 402 coupled to a radio network part. The radio network part comprises a base station (evolved-nodeB) 404, a first terminal device 406 and a second terminal device 408. It will of course be appreciated that in practice the radio network part may comprise a plurality of base stations serving a larger number of terminal devices across various communication cells. However, only a single base station and two terminal devices are shown in FIG. 4 in the interests of simplicity.

Although not part of the telecommunications system 400 itself, also shown in FIG. 4 are some other devices which are operable to wirelessly communicate with one another and which are operating within the radio environment of the telecommunications system 400. In particular, there is a pair of wireless access devices 416 communicating with one another via radio link 418 operating in accordance with a Wi-Fi standard and a pair of Bluetooth devices 420 communicating with one another via radio link 422 operating in accordance with a Bluetooth standard. These other devices represent a potential source of radio interference for the telecommunications system 400. It will be appreciated that in practice there will typically be many more such devices operating in the radio environment of the wireless telecommunications system 400, and only two pairs of devices 418, 422 are shown in FIG. 4 for simplicity.

As with a conventional mobile radio network, the terminal devices 406, 408 are arranged to wirelessly communicate data to and from the base station (transceiver station) 404. The base station is in turn communicatively connected to a serving gateway, S-GW, (not shown) in the core network part which is arranged to perform routing and management of mobile communications services to the terminal devices in the telecommunications system 400 via the base station 404. In order to maintain mobility management and connectivity, the core network part 402 also includes a mobility management entity (not shown) which manages the enhanced packet service, EPS, connections with the terminal devices 406, 408 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 402 to an external packet data network, for example the Internet. As noted above, the operation of the various elements of the communications system 400 shown in FIG. 4 may be broadly conventional apart from where modified to provide functionality in accordance with examples of the disclosure as discussed herein.

The terminal devices 406, 408 each comprise a transceiver unit 406a, 408a for transmission and reception of wireless signals and a controller unit 406b, 408b configured to control the operation of the respective devices 406, 408 in accordance with examples of the disclosure. The respective controller units 406b, 408b may each comprise a processor unit which is suitably configured/programmed to provide the desired functionality described herein using conventional programming/configuration techniques for equipment in wireless telecommunications systems. For each of the terminal devices 406, 408, their respective transceiver units 406a, 408a and controller units 406b, 408b are schematically shown in FIG. 4 as separate elements for ease of representation. However, it will be appreciated that for each terminal device the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the terminal devices 406, 408 will in general comprise various other elements associated with their operating functionality in accordance with established wireless telecommunications techniques (e.g. a power source, possibly a user interface, and so forth).

As has become commonplace in the field of wireless telecommunications, terminal devices may support Wi-Fi and Bluetooth functionality in addition to cellular/mobile telecommunications functionality. Thus the transceiver units 406a, 408a of the respective terminal devices may comprise functional modules operable according to different wireless communications operating standards. For example, the terminal devices' transceiver units may each comprise an LTE transceiver module for supporting wireless communications in accordance with an LTE-based operating standard, a WLAN transceiver module for supporting wireless communications in accordance with a WLAN operating standard (e.g. a Wi-Fi standard), and a Bluetooth transceiver module for supporting wireless communications in accordance with a Bluetooth operating standard.

The underlying functionality of the different transceiver modules may be provided in accordance with conventional techniques. For example, a terminal device may have separate hardware elements to provide the functionality of each transceiver module, or alternatively, a terminal device might comprise at least some hardware elements which are configurable to provide some or all functionality of multiple transceiver modules. Thus the transceiver units 406a, 408a of the terminal devices 406, 408 represented in FIG. 4 are assumed here to provide the functionality of an LTE transceiver module, a Wi-Fi transceiver module and a Bluetooth transceiver module in accordance with conventional wireless communications techniques.

The base station 404 comprises a transceiver unit 404a for transmission and reception of wireless signals and a controller unit 404b configured to control the base station 404. The controller unit 404b may comprise a processor unit which is suitably configured/programmed to provide the desired functionality described herein using conventional programming/configuration techniques for equipment in wireless telecommunications systems. The transceiver unit 404a and the controller unit 404b are schematically shown in FIG. 4 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 404 will in general comprise various other elements associated with its operating functionality. For example, the base station 404 will in general comprise a scheduling entity responsible for scheduling communications. The functionality of the scheduling entity may, for example, be subsumed by the controller unit 404b.

Thus, the base station 404 is configured to communicate data with the first and second terminal devices 406, 408 over respective first and second radio communication links 410, 412. The wireless telecommunications system 400 supports a carrier aggregation mode of operation in which the first and second radio communication links 410, 412 each comprise a wireless access interface provided by multiple component carriers. For example, each radio communication link may comprise a primary component carrier and one or more secondary component carriers. Furthermore, the elements comprising the wireless telecommunications system 400 in accordance with this example of the disclosure are assumed to support carrier aggregation in an unlicensed spectrum mode. In this unlicensed spectrum mode the base station communicates with terminal devices using a primary component carrier operating on radio resources within a first frequency band that has been licensed for use by the wireless telecommunications system and one or more secondary component carriers operating on radio resources within a second frequency band that has not been licensed for exclusive use by the wireless telecommunications system. The first frequency band may sometimes be referred to herein as a licensed frequency band and the second frequency band may sometimes be referred to herein as an unlicensed (U) frequency band. In the context of an LTE-based wireless telecommunications system, such as that represented in FIG. 4, operation in the unlicensed frequency band may be referred to as an LTE-U mode of operation. The first (licensed) frequency band may be referred to as an LTE band (or more particularly an LTE-A band) and the second (unlicensed) frequency band may be referred to as an LTE-U band. Resources on the LTE-U band may be referred to as U-resources. A terminal device able to make use of U-resources may be referred to as a U-terminal device (or U-UE). More generally, the qualifier "U" may be used herein to conveniently identify operations in respect of the unlicensed frequency band.

It will be appreciated that the use of carrier aggregation techniques and the use of unlicensed spectrum resources (i.e. resources that may be used by other devices without centralised coordination) in accordance with examples of the disclosure may be based generally on previously proposed principles for such modes of operation, for example as discussed above, but with modifications as described herein to provide additional functionality in accordance with examples of the present disclosure. Accordingly, aspects of the carrier aggregation and unlicensed spectrum operation which are not described in detail herein may be implemented in accordance with known techniques.

Modes of operation for the wireless telecommunications network 400 represented in FIG. 4 in accordance with certain examples of the disclosure will now be described. The general scenario for these examples is assumed to be one in which a carrier aggregation capable terminal device is operating in an LTE-A cell as normal, and the base station determines that it should configure the LTE-U capable terminal device with an additional aggregated carrier using LTE-U resources. The specific reason why the base station determines that it should configure a particular terminal device for LTE-U based carrier aggregation is not significant. Thus the LTE-A carrier provides a Pcell for the terminal device and the LTE-U resources provide one or more Scell(s) for the terminal device. It will be appreciated the LTE-A resources may also be used to provide component carriers associated with one or more further Scells(s) in accordance with conventional carrier aggregation techniques. For the examples described with reference to FIG. 4, the LTE-A transmissions in the licensed frequency band and the LTE-U transmissions in the unlicensed frequency band, and thus the Pcell and Scell(s), are both made from the same base station 404, but this may not be the case in other examples. The LTE-U carrier could in general be utilised with a TDD (time division duplex) or FDD (frequency division duplex) frame structure. However, a consequence of some aspects of existing regulatory restrictions on unlicensed spectrum usage in some regions means that TDD or downlink-only FDD operation may, at least currently, be more likely. Although the present disclosure is generally described in the context of FDD, the same teachings apply equally to a TDD frame structure, and the skilled person would be able to apply the teachings of the present disclosure to such a TDD frame structure.

Accordingly, based on carrier aggregation techniques, unlicensed spectrum can be used in combination with licensed spectrum for the transmission of data between terminal devices and base stations. However, the use of an unlicensed spectrum has a significant effect on resources planning and utilisation, in particular for MNOs. Conventionally, an MNO would only use a licensed spectrum, which is not shared with another party and would carry out drive tests to audit an area in respect of coverage, signal power, interferences, performance, etc. to assess the coverage quality. Drive tests are conventionally carried out using field engineers to manually collect measurement data. The collected data is then used by the MNO to adjust, if necessary, the network configuration (e.g. frequency bands, transmission power, etc.) with a view to optimising the resource utilisation in the area. Recently, there has been discussion of using terminal devices to send quality reports to the network with a view to avoiding traditional drive tests. The Minimisation of Drive Tests (MDT) is discussed in particular in 3GPP TS 37.320 [7], 3GPP TR 36.805 [8] and 3GPP TS 32.422 [9]. MDT discusses that terminal devices may be asked to collect data on the network performance and to report on the measurement back to the network.

While MDT can help simplify how the data is collected and reported to the network by alleviating the need for field engineers to be deployed when quality data is to be collected, the network optimisation remains significantly facilitated by the fact that the frequency bands or channels used are in a licensed spectrum. As a result, the transmissions within the network should only suffer from interferences from signals from the same network, i.e. within the MNO's control. In contrast, when using unlicensed frequencies, interferences can be caused by any other type of signals without the control of the MNO, such as Wi-Fi communications, Bluetooth, near field communication (NFC) devices or even microwave devices. In this situation, any spectrum and resources management is significantly complicated and, essentially, conventional spectrum management methods cannot provide the same results in an unlicensed spectrum than in a licensed—and thus controlled-spectrum. Additionally, the MNO is not in a position to plan for frequency resources as the MNO cannot know in advance whether certain frequency resources will be used or available for its transmission, contrary to resources in a licensed band. It is therefore desirable to facilitate frequency planning for the MNO when using unlicensed spectrum.

In accordance with an example of the present disclosure, a terminal device may be operable to collect measurements and to obtain an indication of a channel occupancy level for an unlicensed frequency band. The channel occupancy level for a period of time is estimated based on a channel occupancy state obtained for each of a set of shorter time periods within the period of time for the channel occupancy level. Accordingly, the terminal device can collect occupancy information in respect of an unlicensed spectrum so as to form a view of whether the channel is shared with many active devices (upon which the MNO has potentially no control). Such an occupancy level as determined by the terminal device can be used for the network (e.g. base station) to decide whether an unlicensed frequency band may be used to transmit data. Advantageously, such an occupancy level can provide the MNO with an indication of whether resources are likely to be available in the spectrum and thus of the likelihood of having successful transmissions using this spectrum. In view of the number of technologies and devices potentially using the frequency band, the MNO may rely on more opportunistic allocation mechanisms, rather than conventionally planned resources allocations, such that an indication of an occupancy level for an unlicensed band provides a useful tool for the MNO to try to use that unlicensed band.

Figure 5:
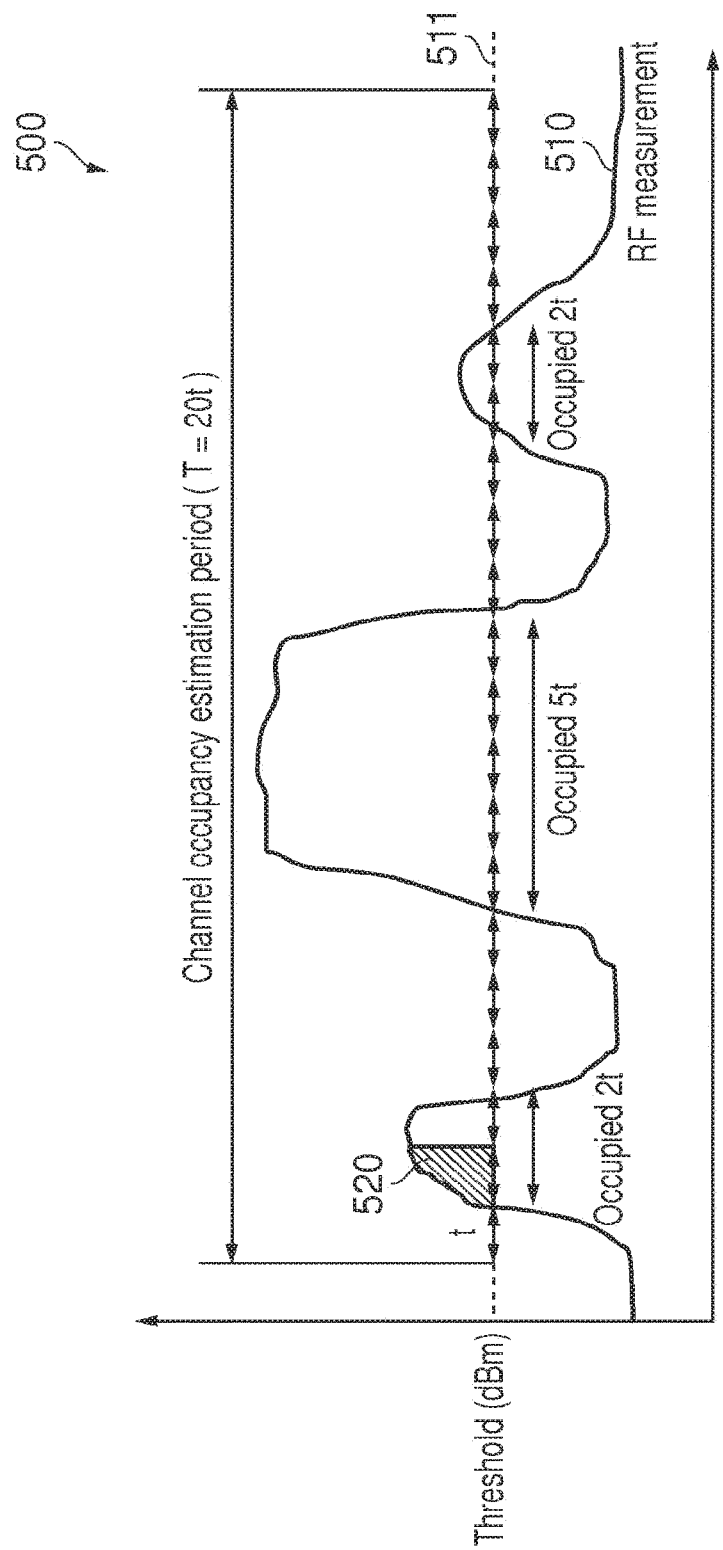
FIG. 5 provides a schematic illustration of a channel occupancy measurement.

FIG. 5 provides a schematic illustration of a channel occupancy measurement. A channel occupancy state is measured for a short period "t" and provides an indication of the occupancy of the channel on that time period t. In the example of FIG. 5, the state may be one of "occupied" or "free" but in other examples, more and/or different states may be used. A channel occupancy level is measured for a longer time period "T", wherein a plurality of short time periods "t" are within the longer time period "T". In this example, the long time period T is made of 20 consecutive short time periods "t", however in other examples, the relative short/long time period arrangement may be different, as discussed below. In the remainder of the description, the short period t and long period T may also be referred to as first and second (time) periods, respectively. FIG. 5 illustrates with graphic 500 the power 510 (in dBm, ordinate) received by a transceiver depending on the time (abscissa). For example, an LTE transceiver may operate in a measurement mode when no LTE transmissions are scheduled and may measure all power received in the unlicensed band. For each of the first periods, the terminal (e.g. the controller unit of the terminal) determines whether the band is occupied or free. This can be performed by comparing the received power 510 with a threshold 511. For example, if the power 510 is above the threshold 511 for the entire duration of the period t, the band will be considered as occupied, otherwise it will be considered as free. In other examples, for the band to be considered as occupied, the power 510 will have to be above the threshold 511 for at least a portion p of the time period t, where p can for example be 50% or any suitable range in the 1%-99% range. In other examples, the occupancy state may be determined based on the energy received for transmissions where the power 510 is above threshold 511. This can be illustrated in the example of FIG. 5, with the second short period, where the power 510 is above the threshold 511. In this example, the area 520 (corresponding to the energy for the transmission power above the threshold) may be calculated or estimated when trying to determine the occupancy state for this short time period. This area 520 may then be compared with a second threshold to estimate the band's occupancy state for this short period. For example, depending on the selected second threshold, in some cases it may be considered that the band is occupied for the short periods number 2-3 and 7-11 but not for the short periods 15-16.

In the example illustrated in FIG. 5, it is determined from the power 511 received on the unlicensed band that the channel is occupied at the short time periods number 2-3, 7-11 and 15-16 of time periods 1-20 (e.g. based on a power 510 being above the threshold 511 for at least a portion p=80% of the short time period). The band is thus considered as occupied for nine (9) of the short time periods and the occupancy level derived from this can for example be calculated as 9/20=45%. Such an occupancy level provides an indication of how much the band is used by other parties and an MNO can thus make use of this information when planning resources allocation. The MNO could also use this information when deciding whether to use the band for a secondary carrier and/or how much data it should be able to send though this secondary carrier based on the occupancy level reports it has received from terminal devices.

Figure 6:
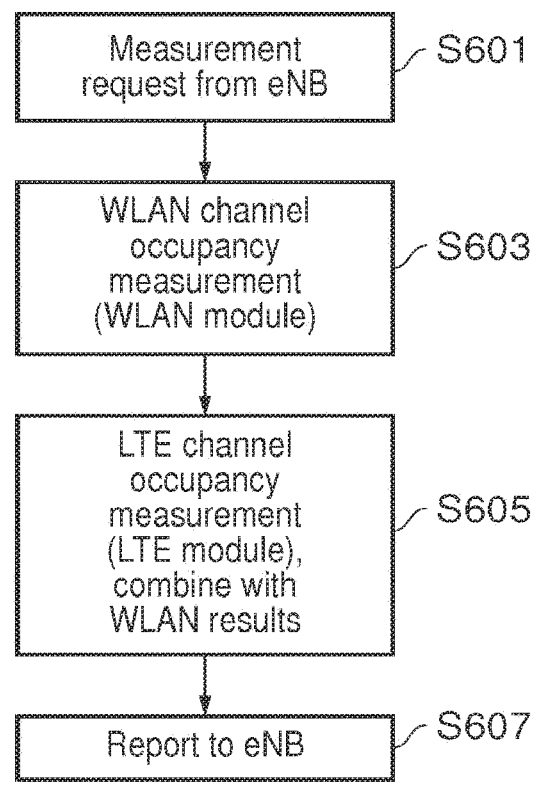
FIG. 6 provides a schematic flowchart of a method of measuring and of reporting occupancy.

FIG. 6 provides a schematic flowchart of a method of measuring and of reporting occupancy. In this example, a terminal device 406, 408 has dual wireless capabilities with WLAN and LTE capabilities, and measures an occupancy level on an unlicensed channel which may also be used by WLAN technologies. In the example of FIG. 6, the terminal device first received the measurement request from the eNB at S601. Upon reception of the request, the terminal device measures the WLAN occupancy using its WLAN module at S603. For example the WLAN module can monitor the WLAN transmissions in the unlicensed band. At step S605, the terminal device measures the LTE channel occupancy using the LTE module and combines the measurements results from the LTE module with the measurements results from the WLAN module. In a first example, the specific measurement results may be combined by generating global measurement results which includes both LTE and WLAN measurement results, separately. In a second example, they may be combined by processing the measurement results for WLAN and LTE to generate global measurement results which provides measurement data derived from WLAN and LTE measurements. For example, if it is estimated that there is an overlap between LTE and WLAN measurements, measurement data can be derived from this, for instance to generate additional measurement data. For example, global measurement results may be generated which can include LTE measurement results, WLAN measurement results and estimated non-LTE and non-WLAN measurement results wherein the latter is derived from the WLAN and LTE measurement results.

As an illustration, if at a point in time in a specific frequency band, both the LTE and WLAN transceivers estimate a received power at the value "P" while the LTE and WLAN transceiver each estimates that, within P, the LTE received power is $P_L$ and the WLAN received power is $P_W$, respectively, the two examples above could for example result in:

First example: the global measurements include the WLAN and LTE measurements, separately. For example, it may include an indication that the WLAN transceiver received $P_W$ and P as WLAN and total power, respectively and that the LTE transceiver received $P_L$ and P as LTE and total power, respectively.

Second example: the global measurement may optionally include the same measurements as in the first example, and additional measurements as follows: derived measurements may include an indication that at that point in time P power was received in the frequency band, including $P_L$ for LTE communications, $P_W$ for WLAN communications and $(P-P_L-P_W)$ for non-LTE/non-WLAN communications.

In the example of FIG. 6, the WLAN measurements and the LTE measurements are shown as being performed sequentially however, in other examples, these measurements may be carried out in a different order or may be carried out in parallel. Then, at step S607, the terminal device sends a report on the measured occupancy to the eNB 404. In this example, the WLAN occupancy measurements may help estimating whether there is an active WLAN network in the area, i.e. active transmissions in the shared band from different technologies, while the LTE occupancy measurements may help estimating whether other mobile networks are using the shared band for LTE transmissions. Based on a combination of the occupancy measurements, the terminal device 406, 408 can generate an occupancy report based on third parties' transmissions in the shared band using the WLAN and LTE technologies. In some examples, the report may indicate an overall channel occupancy for the unlicensed band regardless of the technology. In other examples, the report may indicate a channel occupancy for the unlicensed band taking into account the technology. Such a report may for example show a 10% occupancy for WLAN and a 50% occupancy for LTE. It is noteworthy that the report may include occupancy levels with and without taking into account the technology of the transmissions. For example, a report may show an overall 40% occupancy, a 30% occupancy for WLAN and a 20% occupancy for LTE (if for example WLAN only is active for 20% of the time, LTE only is active for 10% of the time and both LTE and WLAN are active for 10% of the time).

Thus, the terminal device makes measurements of radio usage in the unlicensed frequency band in its environment. In particular, the terminal device measures the degree of radio usage at different frequencies across the second frequency band. For example, the terminal device may use its WLAN transceiver module to scan for activity associated with other wireless communication devices, for example, Wi-Fi access points. From this the terminal device may establish, for example, an indication of frequency resources used by other wireless communications devices and/or an indication of a received signal strength for wireless communications associated with other wireless communications devices and/or an indication of an identifier for the other wireless communications device (e.g. SSID). The terminal device may also scan for radio usage in the second frequency band by other devices operating according to other operating standards, for example Bluetooth and/or other LTE networks. In some examples the terminal device might not separately measure radio usage by different technologies, but may simply measure an aggregate level of radio signals (which may include radio noise) in its environment at different frequencies across the unlicensed frequency band. The terminal device then transmits an indication of the measurements of radio usage at different frequencies across the second frequency band to the base station. This may be done on uplink radio resources on the already-configured primary cell to which the terminal device is connected in accordance with conventional signalling techniques, for example in accordance with the established principles of measurement report RRC signalling, or on other uplink radio resources.

In the examples above, the indication of the channel occupancy is generally for signals on the channel which are not signals to or from the base station. They are instead signals transmitted by other wireless communications systems, such as a WLAN network, Bluetooth systems or another LTE system (e.g. made by another MNO). In other words, the channel utilisation measured on the shared channel is preferably for transmissions other than transmissions with the base station or the mobile network of the terminal device. This is with the view to estimating the utilisation of the shared channel by other wireless systems which may affect the energy transmissions of the LTE network. As mentioned in the present disclosure, the shared channel is used by other parties over which the MNO has no control which makes any interference avoidance scheme much more complex than in the conventional mobile network situation. However, various MNOs may decide to work together to reduce the interferences caused by their respective LTE transmissions in the shared channel. The LTE transmissions in an unlicensed channel or in a shared channel would still be vulnerable to interferences with other transmissions in the same frequency band however the level of interferences between LTE transmissions from different mobile networks could be reduced. By agreeing on improving the sharing of the shared channel, the MNOs could improve the quality and or success rate of their own transmissions in this shared channel. In the event that two (or more) mobile network operators agree to a form of sharing scheme for the transmission on the shared channel, it may be beneficial to obtain an indication of the channel utilisation level which excludes the LTE transmissions from the friendly MNO. With a view to addressing this situation, and in accordance with the present disclosure, there can be provided a quiet time for the MNOs to obtain indications of the channel occupancy level for other technologies and for non-friendly MNOs.

Figure 7:
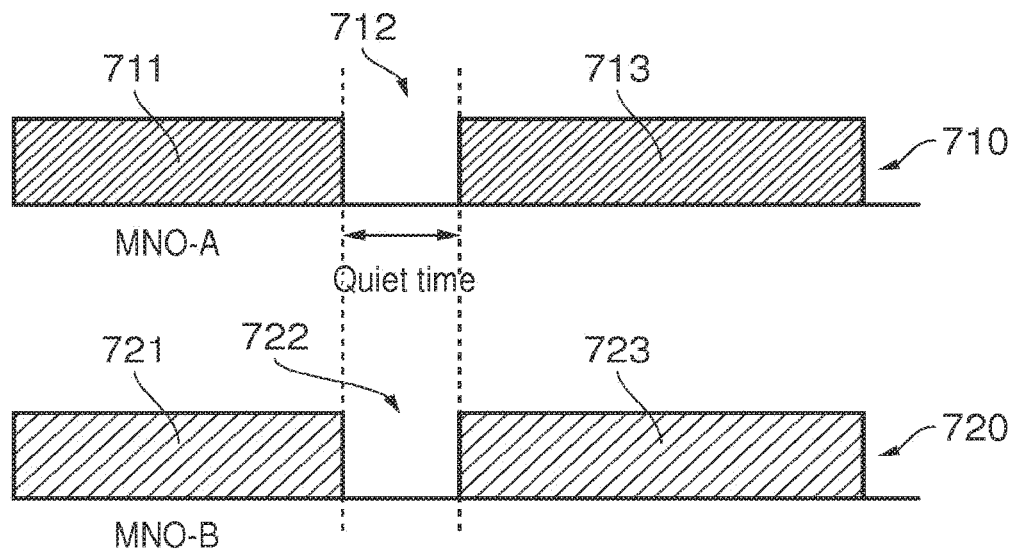
FIG. 7 provides a schematic time diagram showing an example use of a quiet time.

FIG. 7 provides a schematic time diagram showing an example use of a quiet time. In this example, the transmissions from a first mobile operator MNO-A are shown in timeline 710, while transmissions from a second mobile operator MNO-B are shown in timeline 720. The two operators have agreed on a common quiet time during which they both stop transmitting LTE signals. Thus the first operator MNO-A transmits signals 711 before the quiet time, then stops transmitting during quiet time 712, and resumes transmissions once the quiet time is over by transmitting signals 713. Likewise, the second operator MNO-B transmits signals 721 before the quiet time, then stops transmitting during quiet time 722, and resumes transmissions once the quite time is over by transmitting signals 723. Accordingly, both mobile operators can carry out occupancy levels monitoring during the quiet times and thereby avoid being affected by each other's LTE transmissions when they survey the shared channel. Even though the operators' transmissions in timelines 710 and 720 have been represented as blocks, this is a simplification for the purpose of illustrating the use of quiet time, and it is understood that the base stations may not been transmitting signals for the entire time periods for blocks 711, 713, 721 and 723. For example, as a result of a sharing scheme between the two operators, only one of the two operators may be transmitting at point in time. For example, operator MNO-A may be transmitting signals during period 711 but not during period 713 while operator MNO-B may not be transmitting signals during period 721 but may be transmitting signals during period 723.

Figure 8:
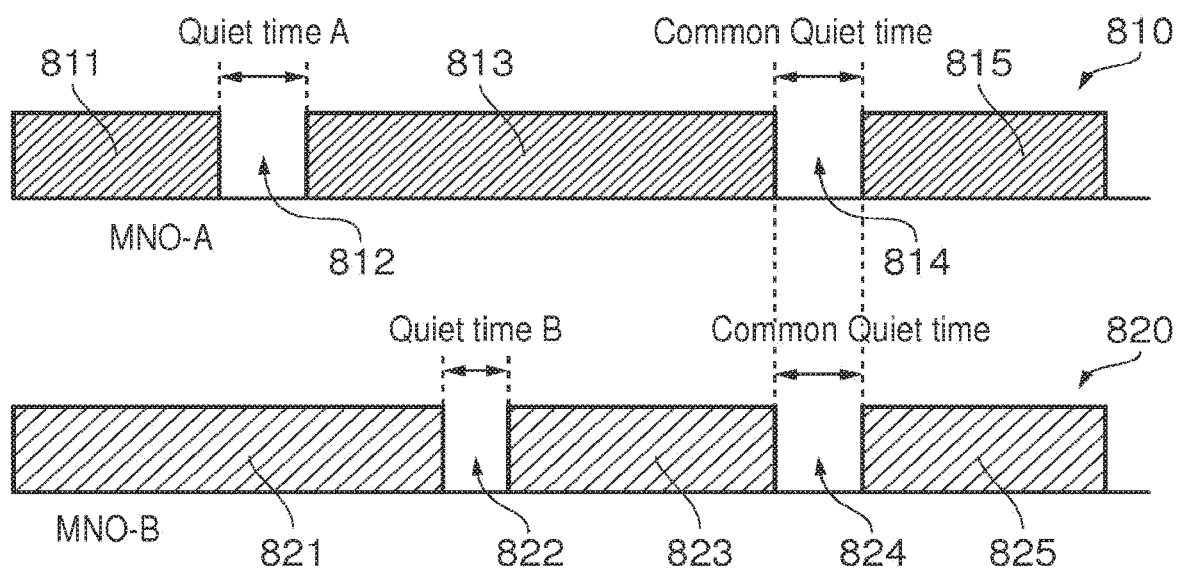
FIG. 8 provides a schematic time diagram showing another example use of quiet times.

FIG. 8 provides a schematic time diagram showing another example use of quiet times. In this example, timeline 810 illustrates active transmission times for a first operator MNO-A and timeline 820 illustrates active transmission times for a second operator MNO-B. The two operators have agreed on a common quiet time which corresponds to quiet time 814 for MNO-A and to quiet time 824 for MNO-B. However the operators each also have a respective quiet time during which the other operator may be transmitting signals on the shared channel. As a result, operator MNO-A can transmit signals during times 811, 813 and 815 but will stop transmissions during quiet times 812 and 814 while operator MNO-B can transmit signals during times 821, 823 and 825 but will stop transmissions during quiet times 822 and 824. During quiet time 812, MNO-A can obtain an indication of the occupancy level for the shared channel including transmissions from the other operator and it can obtain an indication of the occupancy level without transmissions from the other operator during quite time 814. The same teachings apply to the corresponding quiet times 822 and 824 of timeline 820 in respect of operator MNO-B.

In the discussions above, the measurements carried out by a UE are generally carried out while its mobile network is not transmitting. Such an arrangement can be helpful for determining an indication of an occupancy level of the shared channel based on all transmissions but for the ones from the UE's mobile network. This is because these signals (the signals from a network that is not the UE's mobile network) are the ones that may cause interferences with LTE signals from the UE's mobile network, should the mobile network decide to use a secondary carrier on the shared channel. Such an arrangement can also simplify the amount of processing required for occupancy measurement as any signal received by the transceiver in the frequency band being surveyed is a potential interferer signal. However, in accordance with the present disclosure, the occupancy measurements may also be carried out while the UE's mobile network is transmitting signals to the UE.

Figure 9:
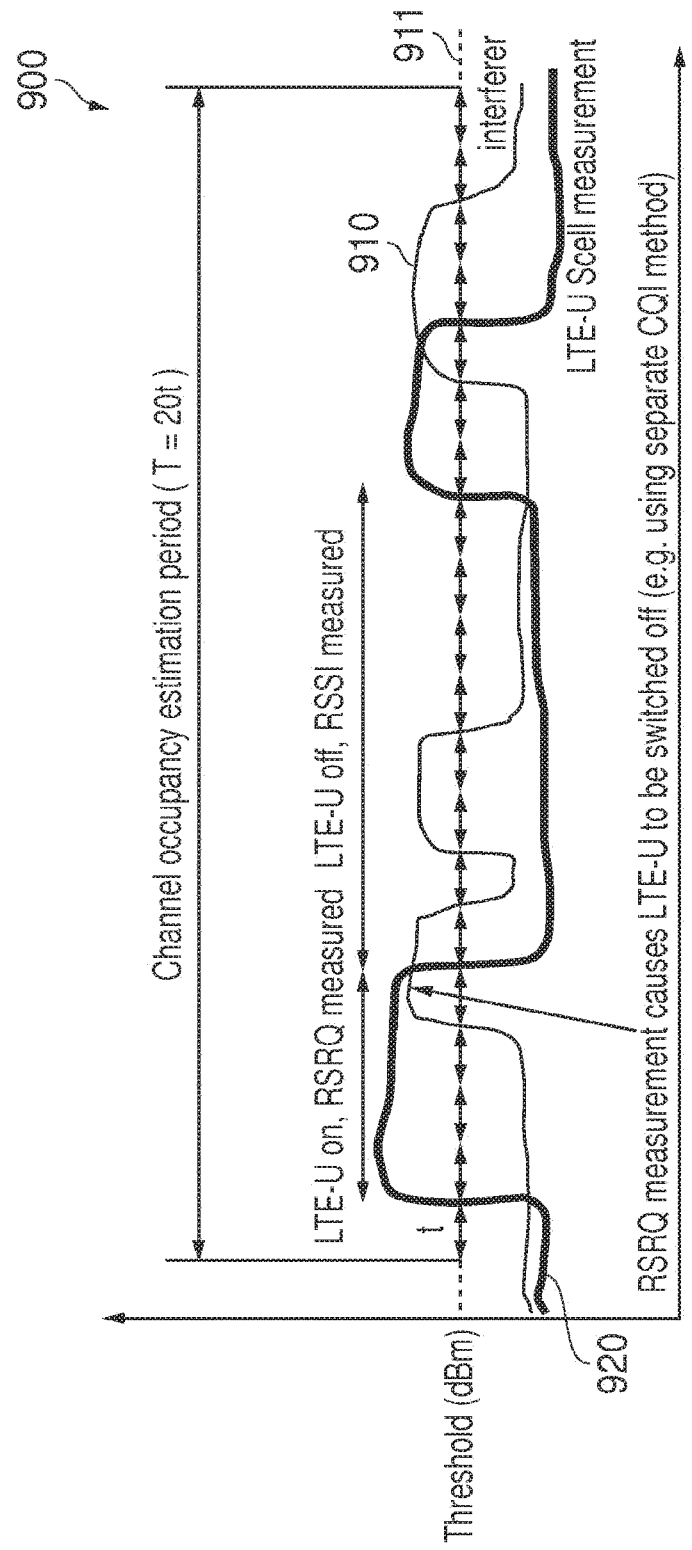
FIG. 9 provides a schematic illustration of another channel occupancy measurement.

FIG. 9 provides a schematic illustration of another channel occupancy measurement where different measurement methods may be employed depending on whether the UE is receiving LTE signals from the base station or not. In the graph 900, the line 920 (the thicker line) represents LTE signals sent via the secondary carrier on the shared channel while line 910 (the thinner line) represent other signals in the shared channel, i.e. potential interferer signals, that have been identified by the UE. While the LTE network is using the shared channel, the UE can measure the Reference Signal Received Quality (RSRQ) so as to obtain an indication of the level of the signal quality in the channel during the transmissions from the UE's mobile network, and may measure the Received Signal Strength Indicator (RSSI) when the base station is not sending LTE signals via the shared channel. The RSRQ is based on the Reference signal receive power (RSRP) which is for LTE only and the RSSI which includes interference signals. Accordingly, the UE can obtain an indication of the occupancy level on the channel in situations where the mobile network is actively sending signals to the UE and in situations where it is not actively sending signals to the UE. In this example, the LTE network starts using the shared channel from the second short period and, at the fifth short period, an interferer signal is transmitted on the same channel. This can be identified using the RSRQ measurement (or any other type of measurement indicating an interference level identified for the signals transmitted by the base station on the shared channel). When the LTE-U is inactive (e.g. from the short time periods 6 to 13) the UE can use the RSSI measurement or any other type of measurement indicating a power received via the shared channel to obtain an indication of the occupancy levels on the shared channel. In the example of FIG. 9:

during the short time periods 1, 7, 10 to 13, 19 and 20 the shared channel is considered as being free based on RSSI or RSSI-like measurements, during the short time periods 6, 8, 9, 17 and 18 the shared channel is considered as being occupied based on RSSI or RSSI-like measurements during short time periods 2 to 4, 14 and 15 the shared channel is considered as being free based on RSRQ or RSRQ-like measurements and during short time periods 5 and 16 the shared channel is considered as being occupied based on RSRQ or RSRQ-like measurements.

In this example, the terminal device can thus determine that the shared channel is estimated as being free for 13 of the 20 short time periods and as being occupied for 7 of the 20 short time periods. Therefore the occupancy level is estimated at 7/20=35%. This 35% estimation provides an indication of the occupancy level of the shared channel for the long time period T.

Accordingly, the measurements for determining an occupancy state or level of the shared channel may be based on information obtained from the LTE module only and/or may be based on information obtained while the mobile network is transmitting signals via the shared channel.

The channel occupancy levels discussed in the present disclosure provides an additional type of information when surveying the shared channel (compared to existing LTE channel surveying arrangements) wherein this information is suitable for opportunistic data scheduling in LTE-U. The network can use the occupancy information to estimate whether the channel can be used for sending data and, if so, how much (in time) of the channel may be available for sending the data. For example this information may be used when deciding whether to set up an LTE-U secondary cell as discussed in the present disclosure. Additionally, the occupancy information may be used when an LTE-U secondary cell is already active when monitoring the quality in this cell. This occupancy information may also be linked to the location of the UE which reported the information so that the network can build an overall view of the network based on different reports UEs and/or from a UE sending reports from different locations. The network may also use additional information when building this view from the reports such as the time of day, day of week, other time aspects, interferer signals' technology, etc.

Figure 10:
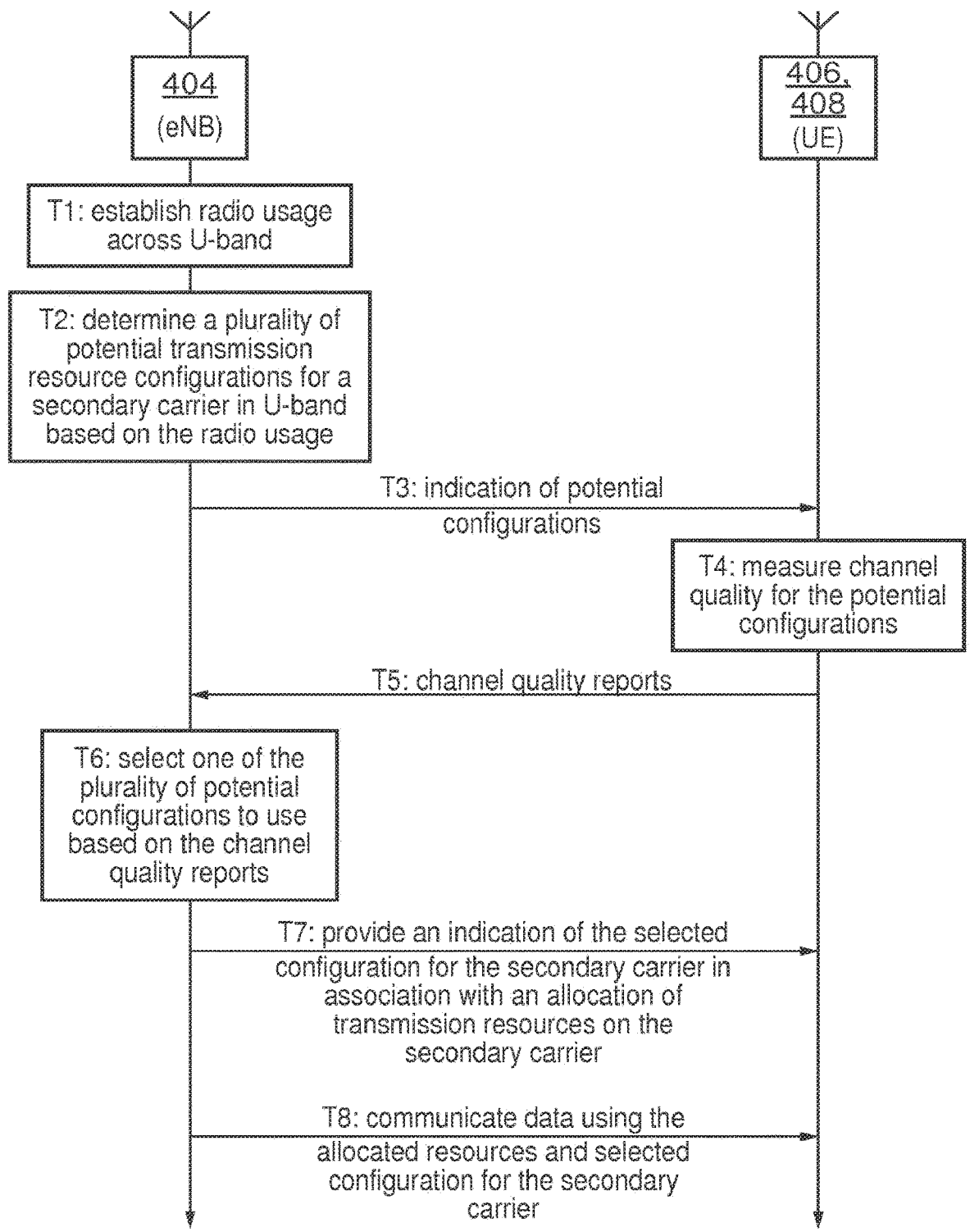
FIG. 10 provides a signalling ladder diagram representing communications between a base station and a terminal device.

FIG. 10 is a signalling ladder diagram schematically representing modes of operation for one of the terminal devices (UEs) 406, 408 and the base station (eNB) 404 schematically represented in FIG. 4, illustrating example situations where it may be desirable to obtain an indication of an occupancy level of the shared channel from one or more UEs. The operation is for communicating using a primary component carrier (associated with a primary cell) operating on radio resources within a first frequency band and a secondary component carrier (associated with a secondary cell) operating on radio resources within a second frequency band. As discussed above, the first frequency band is taken to correspond with resources that have been licensed for dedicated use by the operator of the wireless telecommunications system 400 whereas the second frequency band is taken to correspond with resources that are shared by other wireless communication technologies, and in particular in this example by Wi-Fi. In broad summary, a plurality of transmission resource configurations (e.g. frequencies) can be established that might potentially be used for a secondary carrier in the context of carrier 2o aggregation using radio resources that are shared between different network operators and/or different wireless access technologies, and it can be indicated to a terminal device which configuration is to be used in association with an allocation of transmission resources on the secondary carrier.

Some aspects of the operation represented in FIG. 10 are performed in a generally iterative manner as discussed further below. Processing as schematically represented in FIG. 10 is shown starting from a stage at which the terminal device is configured for operation on the primary cell associated with the primary carrier, but is not yet configured for operation on the secondary cell associated with the secondary carrier. This may be, for example, because the terminal device has only just connected to the primary cell or because a previous secondary cell configuration is no longer valid.

In step T1 the base station establishes a measure of radio usage in the second frequency band. In some example implementations the base station may itself measure radio usage at different frequencies across the second frequency band, but in this example it is assumed the terminal device makes these measurements and reports them to the base station. That is to say, in this example implementation the base station establishes radio usage across the second band (unlicensed band) from reports received from the terminal device (and/or other terminal devices operating in the wireless telecommunications system). Based on the measurement information regarding radio usage in the second frequency band received from the terminal device, the base station establishes radio usage across the secondary band in step T1 represented in FIG. 10.

In step T2 the base station determines a plurality of potential transmission resource configurations, e.g. a plurality of potential carrier frequencies and bandwidths, for a secondary component carrier operating in the second frequency band. This determination is based on the radio usage established in step T1. For example, the base station may be configured to determine four (or another number) of possible frequency configurations (e.g. in terms of centre frequency and/or bandwidth) for a secondary component carrier operating within the second frequency band. These may be selected to correspond with regions of the second frequency band determined to have the lowest amount of radio usage according to usage established in step T1. For example, if the second frequency band supports Wi-Fi and Bluetooth communications by other wireless communication devices operating in the radio environment of the terminal device, the base station may identify regions of the second frequency band which are expected to suffer least from interference from such communications. For example, regions of the second frequency band spectrum where the measurements of radio usage established in step T1 indicate there is relatively little radio traffic that would interfere with LTE-based communications between the base station and the terminal device. More generally, the base station may determine appropriate transmission resources (e.g. in terms of time and/or frequency resources) from within the second frequency band to define a plurality of potential configuration settings for a secondary component carrier based on the radio usage, including for example one or more occupancy reports in accordance with the present disclosure, determined in step T1 using established techniques for selecting appropriate transmission resources in a competitive (opportunistic) radio environment when taking account of measurements of existing usage. For example, the base station may avoid using resources in regions of the second frequency band for which the terminal device measurement reports indicate a relatively high degree of radio usage, and may instead preferentially select configurations for the secondary carrier that make use of transmission resources in spectral regions having a relatively low degree of radio usage.

In this particular example it is assumed the base station is configured to select four potential configurations for a secondary carrier corresponding to the configurations identified as having the lowest expectation of interference. In some cases account may also be taken of throughput. For example, a larger bandwidth that encompasses sub-regions of the second frequency band having relatively high radio usage may nonetheless be selected over a smaller bandwidth that avoids the sub-regions associated with relatively high radio usage to avoid restricting transmissions on the secondary carrier to a relatively narrow bandwidths. In some cases the base station may also take into account its own load, for example some carriers may already have been assigned to other devices to operate using LTU-U.

For this particular example it is assumed step T2 results in the determination of four possible configuration settings, for example in terms of carrier frequencies and/or carrier bandwidths, which might subsequently be used for secondary carrier operation. The different secondary carrier configuration settings may be contiguous or non-contiguous across the second frequency band and may have the same or different bandwidths. For example, the base station may determine the following four potential configuration settings: Configuration 1=a bandwidth of 5 MHz centred on a frequency of F1; Configuration 2=a bandwidth of 10 MHz centred on a frequency of F2; Configuration 3=a bandwidth of 10 MHz centred on a frequency of F3, Configuration 4=a bandwidth of 20 MHz centred on a frequency of F4, where F4=F3+15 MHz such that Configuration 3 and 4 relate to contiguous frequency resources. However, it will be appreciated this is simply one particular example of what might be determined to be an appropriate group of potential configuration settings for a secondary carrier. In particular, in accordance with other implementations, there may be more or fewer potential configuration settings determined in step T2, and furthermore these configuration settings may be subject to restrictions according to the implementation at hand. For example, if a particular implementation allows only a discrete number of bandwidths and/or frequencies for a secondary component carrier (e.g. according to a relevant operating standard for the wireless telecommunications system), this will correspondingly restrict the potential carrier configurations that might be determined in step T2. Thus, in the example of FIG. 10, a plurality of potential configuration settings are determined for a secondary component carrier operating in the unlicensed spectrum In step T3 the base station provides the terminal device with an indication of the potential configuration settings. This may be done on downlink radio resources on the already-configured primary cell in accordance with conventional signalling techniques, for example in accordance with the established principles of radio bearer (re)configuration message RRC signalling. The information transmitted in step T3 represents a plurality of potential transmission resource configuration settings as established in step T2.

In step T4 the terminal device begins measuring channel quality for the secondary carrier configured according to the different potential configurations. The measurements of channel quality for the secondary carrier may be based on example measurement methods discussed in the present disclosure and may also additionally be combined with established channel quality measurement techniques in wireless telecommunications systems. For example, the measurements undertaken in step T4 may include measurements in accordance with the discussion of FIG. 5 above and measurements undertaken for conventional channel quality indicator (CQI) reporting in LTE wireless communication systems. The terminal device may sequentially configure its transceiver in accordance with the different potential configuration settings received in step T3 and undertake channel quality measurement for each secondary carrier configuration in turn based on conventional CQI reporting techniques.

The quality measurement carried out for each of the configurations may include conventional LTE quality measurement indication(s) and/or an additional indication of the occupancy level for the frequencies corresponding to the configurations. If for example the different configurations use different frequency bands, the channel quality measurement for a configuration may involve only obtaining an indication of the occupancy level for the relevant frequency band. In step T5 the terminal device communicates an indication of the channel quality measurements to the base station.

It will be appreciated steps T4 and T5 are shown as separate steps in FIG. 10 for ease of representation. In practice it may be expected that steps T4 and T5 will be performed iteratively for each configuration setting in turn as the terminal device hops through the potential configuration settings. That is to say, the terminal device may configure its transceiver in accordance with the first one of the potential configuration settings, and then measure and report channel conditions for this configuration setting, and then reconfigure its transceiver in accordance with a second one of the potential configuration settings, and then measure and report channel conditions for this configuration setting, and so forth until channel quality reports have been provided to the base station for a secondary carrier operating in accordance with each of the potential configuration settings. However, in another example implementation, and depending on the terminal device's transceiver capabilities, the channel quality measurement and reporting may be performed in parallel for multiple configuration settings.

Step T6 is performed when the base station is ready to schedule the transmission of some data to the terminal device on the secondary carrier. The nature of the data, and the reason why it needs to be transmitted, may not be significant. Based on the channel quality reports received in step T5, the base station selects one of the plurality of potential configuration settings for a secondary carrier to use for transmitting the data to the terminal device. In this regard the base station may, for example, choose the configuration setting which is associated with the best channel conditions, as reported in step T5. When deciding what the best channel conditions may be, the base station can take into account parameters such as link quality and expected transmissions from third parties on the secondary carrier. In addition to selecting what is considered to be the most appropriate configuration setting for the secondary component carrier based on the channel quality reports, the base station also selects resources within the secondary channel to use for communicating the data to the terminal device. These may be selected in accordance with generally conventional scheduling techniques in wireless telecommunications systems, for example taking account of the channel quality reports for the relevant carrier configuration. In some examples, the base station may decide not to use the secondary carrier, for example if a sufficient channel quality cannot be achieved due to poor link quality or an expected high-level of occupancy for the secondary channel.

Step T6 may be executed in response to the terminal device having reported a measurement on one or more of the potential configurations that indicates that the potential configuration is suitable for use as a secondary carrier. For example, if in step T5 the terminal device iteratively reports on the potential configurations and the measurement report from the first potential configuration is deemed to be of sufficient quality, the selection in step T6 may choose the first potential configuration and the terminal device does not need to perform iterative measurements on the second, third and fourth potential configurations.

In step T7 the base station transmits a resource allocation message to the terminal device indicating the resources within the secondary carrier that are scheduled (allocated/granted) for use by the terminal device. The resource allocation message regarding the allocation of resources within the secondary carrier may be based on conventional techniques, for example in an LTE context the message of step T7 may be provided as downlink control information (DCI) signalling on (E)PDCCH in order to indicate transmission resources on PDSCH according to generally conventional techniques. Furthermore, the resource allocation message relating to the secondary carrier may be communicated on the primary carrier in accordance with established cross-carrier scheduling techniques in carrier aggregation scenarios. In the example of FIG. 10, the resource allocation message indicating the allocation of resources within the secondary carrier is additionally associated with an indication of the configuration setting selected by the base station in step T6 for configuring the secondary carrier for transmitting the data to which the resource allocation message relates.

In step T8 represented in FIG. 10, the base station proceeds to communicate data to the terminal device on a secondary component carrier configured in accordance with the selected configuration setting, and using transmission resources within the secondary component carrier as identified by the resource allocation message. The terminal device is able to configure its transceiver in accordance with the selected configuration setting for the secondary carrier and decode the relevant transmission resources to receive the data.

For implementations in which the indication of the selected carrier configuration is provided in the same subframe (time block) as the data to which the resource allocation message relates (for example within a control region of the subframe, e.g. within the (E)PDCCH resource allocation message itself in an LTE-based implementation), the terminal devices may receive and buffer radio signals on transmission resources associated with all the potential carrier configurations so the appropriate transmission resources can be decoded once the selected configuration setting is established by the terminal device from the signalling received from the base station. In other implementations in which the indication of the selected carrier configuration is provided in advance of the subframe containing the data to which the resource allocation message relates, the terminal device may configure its transceiver for receiving the secondary carrier in accordance with the selected configuration settings to allow the allocated resources to be decoded.

After the data is communicated in step T8, the processing may return to step T4 and continue from there in an iterative manner.

VARIATIONS, ALTERNATIVES AND MODIFICATIONS

In the above discussions, the determination of a state (or of an estimated state) as observed by a terminal is based on the power received by a receiver (e.g. in a transceiver) and on whether the power is above a threshold, for example for at least a certain portion p of the time period in question. However, other types of comparisons may be made with the threshold. For example, the average power during the short time period t; the median power during this period; the power at specific point in time within the period (e.g. the power received at the beginning, at the end, in the middle of the period), the minimum or maximum power during the time period or any other identifiable value may be compared with the threshold. Alternatively or in addition, the energy received during the time period may also be compared for a pre-determined value, wherein the energy may be for power above a reference power (e.g. in the example of FIG. 5 the energy identified with area 520 corresponds to power 510 above threshold 511 which serves as a reference power for the purpose of calculating the energy). Therefore, for the purpose of estimating an occupancy state, the "energy" value calculated may be of a negative value (e.g. in the example of FIG. 5, if the energy for power above the threshold 511 is calculated for the fourth short period, the value obtained would be negative). It can thus be understood from this example that the values calculated, estimated and/or derived from channel utilisation measurements may be artificial values generated or estimated for the purpose of obtaining an indication of an occupancy state of the channel during the relevant short time period.

Also, these different mechanisms for determining an occupancy state may be combined in any appropriate manner. For example, a minimum received power may be compared with a first threshold while an average power may be compared with a second threshold and while the energy for transmissions above a third power threshold is compared with a fourth (energy) threshold.

Also, In the examples above, an occupancy state (corresponding to a short period of time t) has been mostly described as being either occupied or free. However, in other examples different states may be considered. For example there could be provided a "partial" state when the signal has been identified but is not very strong. For example there could be provided two thresholds: a lower threshold "I1" and higher threshold "I2".

Using the teachings discussed in respect of FIG. 5 above, for signals under the lower threshold I1, the channel may be considered as free; for signals between the lower threshold I1 and higher threshold I2, the channel may be considered as partial; and for signals above the higher threshold I2, the channel may be considered as occupied. As discussed above further considerations may be taken into account when estimating an occupancy state, such as the relative portion of each state during the short time period t, the energy received during the short time period t and above one or both of the lower and higher thresholds, etc.

In other examples, the occupancy state may be represented by a number between 0 and 1 where 0 represents the channel believed to be free and 1 represents the channel believed to be occupied. A state estimated to be valued at 0.1 for example can indicate that a very low level of transmissions has been identified while a state estimated to be valued at 0.8 can indicate a high level of transmissions in the shared channel. The value for a short time period "t" can be determined using any appropriate estimation mechanism: for example, if all transmissions remain under a threshold I0, the value is set to 0, for all transmissions above a higher threshold I1, the value is set to 1, and for transmissions between thresholds I0 and I1, the values can be distributed from 0 to 1 in a suitable manner, for example linearly or in a non-linear way. When deciding how the transmissions compare with the threshold(s), the same aspects can be considered as discussed above (e.g. taking into account the average, median, minimum, etc.).

Regardless of the occupancy states having two or more possible values, the occupancy level for the corresponding time period (the longer time period T=20×t in the illustrations of FIGS. 5 and 9) may be calculated based on a suitable method, for example by calculating an average (as illustrated in FIGS. 5 and 9 where the channel occupancy percentage can also be viewed as an average across period T of the channel being occupied "1" or free "0" during the short periods) or a weighted sum. For example each state may be given a weight depending on other parameters, e.g. on a confidence level reflecting the confidence in the occupancy state value previously estimated.

It is pointed out that the thresholds or other parameters to be used in accordance with the present disclosure may be set in any appropriate manner. They can for example be pre-determined or configurable by the base station, another network element, the terminal device and/or the user. They may also be set by the network which then transmits the relevant parameters to the terminal devices via the base station. Also, some parameters—and in particular time parameters—may include random components if appropriate. For example, idles UEs may be configured to carry out the next measurements after a timer $T_{next}$ has expired, where $T_{next}$ may include a fixed component $T_{min}$, which corresponds to the minimum waiting time between two measurements, and a random component $T_{ran}$. Due to the random component, different UEs would be likely carry out measurements at different times and to (possibly) send corresponding reports at different times. As a result, the mobile network would be likely to receive reports which are spread out and which correspond to different time periods. This would in turn be beneficial with a view to building a more complete view of the occupancy levels and to spreading the measurement report traffic in time.

In the discussion above, the long time period (for estimating an occupancy level) is made of 20 consecutive short time periods (for estimating an occupancy state). However the relative short/long time period arrangement may be different. For example, the long time period may include fewer or more short time periods, for example it may include 10 short time periods or 30 short time periods. Also the short time periods within the long time period may not be consecutive and some or all of them may be spaced apart in time. For example, in each long time period, a certain number of short time periods may be selected randomly so that the entire long time period may not be surveyed but the network may form a view from a number of such reports as to the occupancy that the terminal devices may experience if transmitting at random times.

As mentioned, the occupancy level estimated by the terminal device is in respect of a shared frequency band. In the case that one or more shared bands may be used or that sub-frequencies within the band may be used, an occupancy level may be estimated for each of the relevant frequency or sub-frequency bands. Accordingly, an occupancy report from the terminal device to the network may be separated out into occupancy levels for different sub-frequencies within a frequency band or for different frequency bands to be surveyed. In the case of sub-frequency bands, the report may also include an indication of the occupancy level for the frequency band as a whole (comprising the sub-frequency bands). In accordance with the present disclosure, a terminal device may carry out an occupancy level estimation in one or more of the following cases: (1) It can be estimated periodically, for example in accordance with a new repetition period or with an existing one, e.g. the CQI measuring or reporting period; (2) it can be estimated upon receipt of a measurement request, for example as discussed in respect of FIG. 10; (3) It can be estimated at a randomly selected time or when one or more predetermined events occur. For example, a terminal device may be configured to carry out occupancy measurements upon request from the network (e.g. from the base station) and, while the terminal device is in idle mode or in a low activity mode, at randomly selected times. In this manner, different terminal devices would normally carry out measurements either when requested to do so, or at statistically different times from the other terminals in the area (due to the random component) while the device has a low activity (thereby avoiding using processing resources on the device when they are required for other tasks). Other predetermined events can include a mobile communications device being powered up, a mobile communication device experiencing congestion on a frequency channel, a user request, a mobile communications network request, the expiry of a timer and a mobile communication device having a low utilisation level.

Likewise, a terminal device may carry out an occupancy level estimation reporting procedure in one or more of: periodically, upon receipt of a measurement report request, at a randomly selected time or when one or more predetermined events occur. Additionally, the terminal device may report an occupancy level when the level is above a certain threshold. For example, the terminal device may determine an indication of an occupancy level on a periodical basis but without automatically reporting the occupancy level to the base station. However, when the occupancy level estimated on this periodical basis is found to be above a certain threshold, the terminal device may then generate a reporting including (at least) this occupancy level and transmit the report to the network, for example via the base station. Accordingly, terminal devices may carry out silent monitoring of possible interferences in the secondary channel and may only use resources for reporting the estimated occupancy levels when they are found to be high, thereby indicating a possible congestion on the secondary channel. Alternatively the terminal device may monitor for low occupancy level and when the occupancy level is below a threshold, report this to the base station so that the base station is aware that the secondary channel may be or become available for use.

In accordance with the present disclosure, a report sent to the network and/or base station includes at least the indication of the occupancy level determined by the terminal device and can also include additional information. For example, it may include an indication of occupancy level for one or more previous (longer) periods, measurement data, an indication of one or more technologies which have been identified as active in the relevant (longer) periods, location information, device identity information, etc. The network may then use reports received from terminal devices for building an overall view of the transmissions which may cause interference depending on parameters such as, location, time, technology, frequency or sub-frequency band, etc.

In the present disclosure, when a mobile communication or telecommunications system is carrying out a step or providing a feature, one or more elements of the system may be carrying the step providing the feature. For example, a decision to activate or deactivate a secondary carrier may be taken at a base station and/or at a core network element. Examples of element of the mobile system include for example a base station, a MME or a S-GW.

Even though in the examples above, the UEs described may include more than one transceiver (for example a WLAN and an LTE transceiver), the present disclosure is also applicable to a UE having only one transceiver (for example an LTE transceiver only). For example, the examples illustrated in FIGS. 7-8 can be implemented with a LTE transceiver only. The other examples in the present disclosure may also be either be directly be implemented with a LTE transceiver only or may be adapted to be implemented with a LTE transceiver only.

Elements are schematically shown in FIGS. 1 and 4 as separate elements for ease of representation. However, it will be appreciated that the functionality of these elements can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the elements will in general comprise various other elements associated with their operating functionality in accordance with established wireless telecommunications techniques (e.g. a power source, possibly a user interface, and so forth).

Further particular and preferred aspects of the present invention are set out in the accompanying independent and dependent claims. It will be appreciated that features of the dependent claims may be combined with features of the independent claims in combinations other than those explicitly set out in the claims so long as the combination is technically possible.

Thus, the foregoing discussion discloses and describes merely example embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Respective features of the present disclosure are defined by the following numbered paragraphs:

Clause 1. A method of determining an indication of an occupancy level in a mobile communications system, wherein the mobile communications system comprises a base station arranged to communicate with a mobile communications device via a wireless interface provided by a first frequency channel allocated to mobile networks communications for the mobile communications system and by a shared channel which can be shared by the mobile communications system and by other wireless communications systems, the method comprising a mobile communications device:
  measuring, for each of a plurality of first time periods within a second time period, a channel utilisation on the shared channel;
  determining channel occupancy states for the shared channel for each of the first time periods based on the measured channel utilisation; and
  determining an indication of an occupancy level for the shared channel for the second time period, wherein the indication of an occupancy level is determined based on the occupancy states for the shared channel for each of the first time periods.

Clause 2. A method according to any preceding clause, the method further comprising the mobile communications device generating a measurement report based on the indication of an occupancy level for the shared channel and transmitting the measurement report to the base station.

Clause 3. A method according to Clause 2, the method comprising the mobile communications device
 detecting that the shared channel is congested or available when an occupancy level for the shared channel is estimated to be above or below, respectively, a congestion threshold; and
 upon detecting that the shared channel is congested or available, generating and transmitting the measurement report.

Clause 4. A method according to clause 2 or 3, the method comprising the mobile communications system:
 upon receipt of the measurement report, determining whether to activate or deactivate the shared channel for uplink and/or downlink communications with mobile communications devices based on the indication of an occupancy level for the shared channel.

Clause 5. A method according to any of clauses 2 to 4, wherein the measurement report is transmitted at one or more of the following times: periodically, upon receipt of a measurement request, at a randomly selected time, upon determination of the occupancy level indication, or when one or more predetermined events occur.

Clause 6. A method according to any preceding clause wherein the indication of an occupancy level is determined at one or more of the following times: periodically, upon receipt of a measurement request, at a randomly selected time, or when one or more predetermined events occur.

Clause 7. A method according to clause 5 or 6 wherein a predetermined event comprises one of: a mobile communications device being powered up, a mobile communication device experiencing congestion on a frequency channel, a user request, a mobile communications network request, the expiry of a timer and a mobile communication device having a low utilisation level.

Clause 8. A method according to any preceding clause wherein the measuring step comprises the mobile communications device
 determining whether the mobile communications system is transmitting signals on the shared channel,
 when it is determined that the mobile communications system is transmitting signals on the shared channel, measuring the channel utilisation based on an interference measurement indicating an interference level identified for the signals transmitted on the shared channel by the mobile communications system; and
 when it is determined that the mobile communications system is not transmitting signals on the shared channel, measuring the channel utilisation based on a measurement indicating a power received via the shared channel.

Clause 9. A method according to any preceding clause wherein the mobile communications device comprises a first transceiver operable to receive shared channel signals with the base station using a first technology and a second transceiver operable to receive shared channel signals using a second technology, the second technology being different from the first technology,
 wherein the method comprises the mobile communications device measuring the channel utilisation based on a first channel utilisation derived from signals received by the first transceiver and on a second channel utilisation derived from signals received by the second transceiver.

Clause 10. A mobile communications device for use in a mobile communications system, the system comprising a base station arranged to communicate with mobile communications devices via a wireless interface provided by a first frequency channel allocated to mobile networks communications for the mobile communications system and by a shared frequency channel which can be shared by the mobile communications system and by other wireless communications systems, the mobile communications device comprising:
 a controller unit and
 a transceiver unit for transmitting signals via the wireless interface,
 the controller unit being configured to:
 measure, for each of a plurality of first time periods within a second time period, a channel utilisation on the shared channel based on signals received by the transceiver unit;
 determine channel occupancy states for the shared channel for each of the first time periods based on the measured channel utilisation; and
 determine an indication of an occupancy level for the shared channel for the second time period, wherein the indication of an occupancy level is determined based on the occupancy states for the shared channel for each of the first time periods.

Clause 11. A mobile communications device according to clause 10, the controller unit being configured to generate a measurement report based on the indication of an occupancy level for the shared channel and to instruct transmission, by the transceiver unit, of the measurement report to the base stations.

Clause 12. A mobile communications device according to clause 11, the controller unit being configured to
 detect that the shared channel is congested when an occupancy level for the shared channel is estimated to be above a congestion threshold; and
 to, upon detection that the shared channel is congested, generate and instruct transmission of the measurement report.

Clause 13. A mobile communications device according to any of clauses 11 to 12, wherein the controller unit is configured to instruct transmission of the measurement report at one or more of the following times: periodically, upon receipt of a measurement request, at a randomly selected time, or when one or more predetermined events occur.

Clause 14. A mobile communications device according to any of clauses 10 to 13, wherein the controller unit is configured to determine the indication of an occupancy level at one or more of the following times: periodically, upon receipt of a measurement request, at a randomly selected time, or when one or more predetermined events occur.

Clause 15. A mobile communications device according to clause 13 or 14, wherein a predetermined event comprises one of: a mobile communications device being powered up, a mobile communication device experiencing congestion on a frequency channel, a user request, a mobile communications network request, the expiry of a timer and a mobile communication device having a low utilisation level.

Clause 16. A mobile communications device according to any of clauses 10 to 15, wherein the controller unit being configured to measure a channel utilisation on the shared channel comprises the controller unit being configured
 to determine whether the mobile communications system is transmitting signals on the shared channel,
 to measure, when it is determined that the mobile communications system is transmitting signals on the shared channel, the channel utilisation based on an interference measurement indicating an interference level identified for the signals transmitted on the shared channel on the shared channel by the mobile communications system; and to measure, when it is determined that the mobile communications system is not transmitting signals on the shared channel, the channel utilisation based on a measurement indicating a power received via the shared channel.

Clause 17. A mobile communications device according to any of clauses 10 to 16, the transceiver of the mobile communications device being a first transceiver operable to transmit and receive signals on the shared channel with the base station using a first technology and a second transceiver operable to transmit and receive signals on the shared channel using a second technology, the second technology being different from the first technology, wherein the controller unit is configured to measure the channel utilisation based on a first channel utilisation derived from signals received by the first transceiver and on a second channel utilisation derived from signals received by the second transceiver.

Clause 18. A mobile communications system comprising:

a base station arranged to communicate with mobile communications devices via a wireless interface provided by a first frequency channel allocated to mobile networks communications for the mobile communications system and by a shared frequency channel which can be shared by the mobile communications system and by other wireless communications systems; and a first mobile communications device configured to:

measure, for each of a plurality of first time periods within a second time period, a channel utilisation on the shared channel;

determine channel occupancy states for each of the first time periods and for the shared channel based on the measured channel utilisation; and determine an indication of an occupancy level for the second time period and for the shared channel wherein the indication of an occupancy level is determined based on the occupancy states for the shared channel for each of the first time periods.

Clause 19. A mobile communications system according to clause 18, wherein the first mobile communications device is configured to generate a measurement report based on the indication of an occupancy level for the shared channel and to transmit the measurement report to the base station.

Clause 20. A mobile communications system according to clause 19, wherein the first mobile communications device is configured to detect that the shared channel is congested when an occupancy level for the shared channel is estimated to be above a congestion threshold; and to, upon detecting that the shared channel is congested, generate and transmit the measurement report.

Clause 21. A mobile communications system according to clause 19 or 20, wherein the mobile communications system is configured to upon receipt of the measurement report, determine for at least one of the base station whether to activate or deactivate the shared channel for communicating with mobile communications devices based on the indication of an occupancy level for the shared channel.

Clause 22. A mobile communications system according to any of clauses 19 to 21, wherein the first mobile communications device is configured to transmit the measurement report at one or more of the following times: periodically, upon receipt of a measurement request, at a randomly selected time, or when one or more predetermined events occur.

Clause 23. A mobile communications system according to any of clauses 18 to 22, wherein the first mobile communications device is configured to determine the indication of an occupancy level at one or more of the following times: periodically, upon receipt of a measurement request, at a randomly selected time, or when one or more predetermined events occur.

Clause 24. A mobile communications system according to clause 22 or 23, wherein a predetermined event comprises one of: a mobile communications device being powered up, a mobile communication device experiencing congestion on a frequency channel, a user request, a mobile communications network request, the expiry of a timer and a mobile communication device having a low utilisation level.

Clause 25. A mobile communications system according to any of clauses 18 to 24, wherein the first mobile communications device being configured to measure a channel utilisation comprises the first mobile communications device being configured to determine whether the base station is transmitting signals on the shared channel, when it is determined that the base station is transmitting signals on the shared channel, measure the channel utilisation based on an interference measurement indicating an interference level identified for the signals transmitted on the shared channel by the mobile communications system; and when it is determined that the base station is not transmitting signals on the shared channel, measure the channel utilisation based on a measurement indicating a power received via the shared channel.

Clause 26. A mobile communications system according to any of clauses 18 to 25, wherein the first mobile communications device comprises a first transceiver operable to receive signals on the shared channel from the base station using a first technology and a second transceiver operable to receive signals on the shared channel using a second technology, the second technology being different from the first technology, wherein the first mobile communications device is configured to measure the channel utilisation based on a first channel utilisation derived from signals received by the first transceiver and on a second channel utilisation derived from signals received by the second transceiver.

Clause 27. Circuitry for a mobile communications device for use in a mobile communications system, the system comprising a base station arranged to communicate with mobile communications devices via a wireless interface provided by a first frequency channel allocated to mobile networks communications for the mobile communications system and by a shared frequency channel which can be shared by the mobile communications system and by other wireless communications systems, wherein the circuitry comprises a controller element and a transceiver element configured to operate together to:

measure, for each of a plurality of first time periods within a second time period, a channel utilisation on the shared channel based on signals received by the transceiver unit;

determine channel occupancy states for the shared channel for each of the first time periods based on the measured channel utilisation; and determine an indication of an occupancy level for the shared channel for the second time period, wherein the indication of an occupancy level is determined based on the occupancy states for the shared channel for each of the first time periods.

REFERENCES

[1] Holma H. and Toskala A, "LTE for UMTS OFDMA and SC-FDMA based radio access", John Wiley and Sons, 2009
[2] ETSI TS 136 211 V11.5.0 (2014 January)/3GPP TS 36.211 version 11.5.0 Release 11
[3] ETSI TS 136 212 V11.4.0 (2014 January)/3GPP TS 36.212 version 11.4.0 Release 11
[4] ETSI TS 136 213 V11.6.0 (2014 March)/3GPP TS 36.213 version 11.6.0 Release 11
[5] ETSI TS 136 321 V11.5.0 (2014 March)/3GPP TS 36.321 version 11.5.0 Release 11
[6] ETSI TS 136 331 V11.7.0 (2014 March)/3GPP TS 36.331 version 11.7.0 Release 11
[7] ETSI TS 137 320 V11.3.0 (2013 April)/3GPP TS 37.320 V12.1.0 (2014-06) Release 12
[8] 3GPP TR 36.805 V9.0.0 (2009 December) Release 9
[9] ETSI TS 132 422 V11.9.0 (2014 March)/3GPP TS 32.422 V12.2.0 (2014-06) Release 12

What is claimed is:

1. A method of determining an indication of an occupancy level in a mobile communications system, wherein the mobile communications system comprises a base station arranged to communicate with a mobile communications device via a wireless interface provided by a first frequency channel allocated to mobile network communications for the mobile communications system and by a shared channel which can be shared by the mobile communications system and by other wireless communications systems, the method comprising a mobile communications device:
measuring, for each of a plurality of first time periods within a second time period, a channel utilisation on the shared channel;
determining channel occupancy states for the shared channel for each of the first time periods based on the measured channel utilisation; and
determining an indication of an occupancy level for the shared channel for the second time period, wherein the indication of an occupancy level is determined based on the occupancy states for the shared channel for each of the first time periods.

2. The method according to claim 1, further comprising: the mobile communications device generating a measurement report based on the indication of an occupancy level for the shared channel and transmitting the measurement report to the base station.

3. The method according to claim 2, the method comprising the mobile communications device:
detecting that the shared channel is congested or available when an occupancy level for the shared channel is estimated to be above or below, respectively, a congestion threshold; and
upon detecting that the shared channel is congested or available, generating and transmitting the measurement report.

4. The method according to claim 2, the method comprising the mobile communications system:
upon receipt of the measurement report, determining whether to activate or deactivate the shared channel for uplink and/or downlink communications with mobile communications devices based on the indication of an occupancy level for the shared channel.

5. The method according to claim 2, wherein the measurement report is transmitted at one or more of the following times: periodically, upon receipt of a measurement request, at a randomly selected time, upon determination of the occupancy level indication, or when one or more predetermined events occur.

6. The method according to claim 5, wherein a predetermined event comprises one of: a mobile communications device being powered up, a mobile communication device experiencing congestion on a frequency channel, a user request, a mobile communications network request, the expiry of a timer and a mobile communication device having a low utilisation level.

7. The method according to claim 1, wherein the indication of an occupancy level is determined at one or more of the following times: periodically, upon receipt of a measurement request, at a randomly selected time, or when one or more predetermined events occur.

8. The method according to claim 1, wherein the measuring step comprises the mobile communications device:
determining whether the mobile communications system is transmitting signals on the shared channel,
when it is determined that the mobile communications system is transmitting signals on the shared channel, measuring the channel utilisation based on an interference measurement indicating an interference level identified for the signals transmitted on the shared channel by the mobile communications system; and
when it is determined that the mobile communications system is not transmitting signals on the shared channel, measuring the channel utilisation based on a measurement indicating a power received via the shared channel.

9. The method according to claim 1, wherein the mobile communications device comprises a first transceiver operable to receive shared channel signals with the base station using a first technology and a second transceiver operable to receive shared channel signals using a second technology, the second technology being different from the first technology,
wherein the method comprises the mobile communications device measuring the channel utilisation based on a first channel utilisation derived from signals received by the first transceiver and on a second channel utilisation derived from signals received by the second transceiver.

10. A mobile communications device for use in a mobile communications system, the system comprising a base station arranged to communicate with mobile communications devices via a wireless interface provided by a first frequency channel allocated to mobile network communications for the mobile communications system and by a shared frequency channel which can be shared by the mobile communications system and by other wireless communications systems, the mobile communications device comprising:
a transceiver configured to transmit signals via the wireless interface; and
a controller configured to:
measure, for each of a plurality of first time periods within a second time period, a channel utilisation on the shared channel based on signals received by the transceiver unit;
determine channel occupancy states for the shared channel for each of the first time periods based on the measured channel utilisation; and determine an indication of an occupancy level for the shared channel for the second time period, wherein the indication of an occupancy level is determined based on the occupancy states for the shared channel for each of the first time periods.

11. The mobile communications device according to claim 10, wherein the controller is configured to generate a measurement report based on the indication of an occupancy level for the shared channel and to instruct transmission, by the transceiver, of the measurement report to the base station.

12. The mobile communications device according to claim 11, wherein the controller is configured to:
detect that the shared channel is congested when an occupancy level for the shared channel is estimated to be above a congestion threshold; and
upon detection that the shared channel is congested, generate and instruct transmission of the measurement report.

13. The mobile communications device according to claim 11, wherein the controller is configured to instruct transmission of the measurement report at one or more of the following times: periodically, upon receipt of a measurement request, at a randomly selected time, or when one or more predetermined events occur.

14. The mobile communications device according to claim 13, wherein a predetermined event comprises one of: a mobile communications device being powered up, a mobile communication device experiencing congestion on a frequency channel, a user request, a mobile communications network request, the expiry of a timer and a mobile communication device having a low utilisation level.

15. The mobile communications device according to claim 10, wherein the controller is configured to determine the indication of an occupancy level at one or more of the following times: periodically, upon receipt of a measurement request, at a randomly selected time, or when one or more predetermined events occur.

16. The mobile communications device according to claim 10, wherein the controller being configured to measure a channel utilisation on the shared channel comprises the controller being configured to:
determine whether the mobile communications system is transmitting signals on the shared channel;
measure, when it is determined that the mobile communications system is transmitting signals on the shared channel, the channel utilisation based on an interference measurement indicating an interference level identified for the signals transmitted on the shared channel on the shared channel by the mobile communications system; and
measure, when it is determined that the mobile communications system is not transmitting signals on the shared channel, the channel utilisation based on a measurement indicating a power received via the shared channel.

17. The mobile communications device according to claim 10, wherein the transceiver of the mobile communications device is a first transceiver operable to transmit and receive signals on the shared channel with the base station using a first technology and a second transceiver operable to transmit and receive signals on the shared channel using a second technology, the second technology being different from the first technology, wherein
the controller is configured to measure the channel utilisation based on a first channel utilisation derived from signals received by the first transceiver and on a second channel utilisation derived from signals received by the second transceiver.

18. Circuitry for a mobile communications device for use in a mobile communications system, the system comprising a base station arranged to communicate with mobile communications devices via a wireless interface provided by a first frequency channel allocated to mobile networks communications for the mobile communications system and by a shared frequency channel which can be shared by the mobile communications system and by other wireless communications systems, wherein the circuitry comprises a controller element and a transceiver element configured to operate together to:
measure, for each of a plurality of first time periods within a second time period, a channel utilisation on the shared channel based on signals received by the transceiver unit;
determine channel occupancy states for the shared channel for each of the first time periods based on the measured channel utilisation; and
determine an indication of an occupancy level for the shared channel for the second time period, wherein the indication of an occupancy level is determined based on the occupancy states for the shared channel for each of the first time periods.

* * * * *